United States Patent [19]

Nakano et al.

[11] Patent Number: 4,810,862
[45] Date of Patent: Mar. 7, 1989

[54] SYSTEM FOR JUDGING PROPRIETY OF USE OF AN INTEGRATED CIRCUIT CARD WITH A CARD TERMINAL

[75] Inventors: Harumi Nakano; Yoshimi Shigenaga, both of Tokyo, Japan

[73] Assignee: Casio Computer Co., Ltd., Tokyo, Japan

[21] Appl. No.: 884,279

[22] Filed: Jul. 10, 1986

[30] Foreign Application Priority Data

Jul. 16, 1985 [JP] Japan .................. 60-156834

[51] Int. Cl.⁴ .............................................. G06K 5/00
[52] U.S. Cl. .................................. 235/380; 235/487; 235/492
[58] Field of Search ............... 235/380, 487, 492, 441, 235/375; 340/825.34; 380/24, 25

[56] References Cited

U.S. PATENT DOCUMENTS

| | | |
|---|---|---|
| 3,906,460 | 9/1975 | Halpern . |
| 3,934,122 | 1/1976 | Riccitelli . |
| 3,971,916 | 7/1976 | Moreno . |
| 4,007,355 | 2/1977 | Moreno . |
| 4,092,524 | 5/1978 | Moreno . |
| 4,105,156 | 8/1978 | Dethloff ........................ 235/441 |
| 4,222,516 | 9/1980 | Badet et al. . |
| 4,230,265 | 10/1980 | Casaly ......................... 235/455 |
| 4,310,720 | 1/1982 | Check, Jr. . |
| 4,317,028 | 2/1982 | Simjian ........................ 235/380 |
| 4,423,287 | 12/1983 | Zeidler ......................... 380/24 |
| 4,535,204 | 8/1985 | Hughes et al. ............... 235/472 X |
| 4,650,975 | 3/1987 | Kitchener .................... 235/492 X |
| 4,727,244 | 2/1988 | Nakano et al ............... 235/492 X |

FOREIGN PATENT DOCUMENTS

WO83/03018 9/1983 PCT Int'l Appl. .

Primary Examiner—M. H. Paschall
Assistant Examiner—A. Jonathan Wysocki
Attorney, Agent, or Firm—Frishauf, Holtz, Goodman & Woodward

[57] ABSTRACT

The data for setting the operating conditions of an IC card is transferred from the IC card to the card terminal, and stored in it. The IC card is driven by the stored data. A signal for checking a state of the compatibility of the IC card with the card terminal is exchanged with each other between the IC card and the card terminal, thereby checking the compatibility between them.

12 Claims, 21 Drawing Sheets

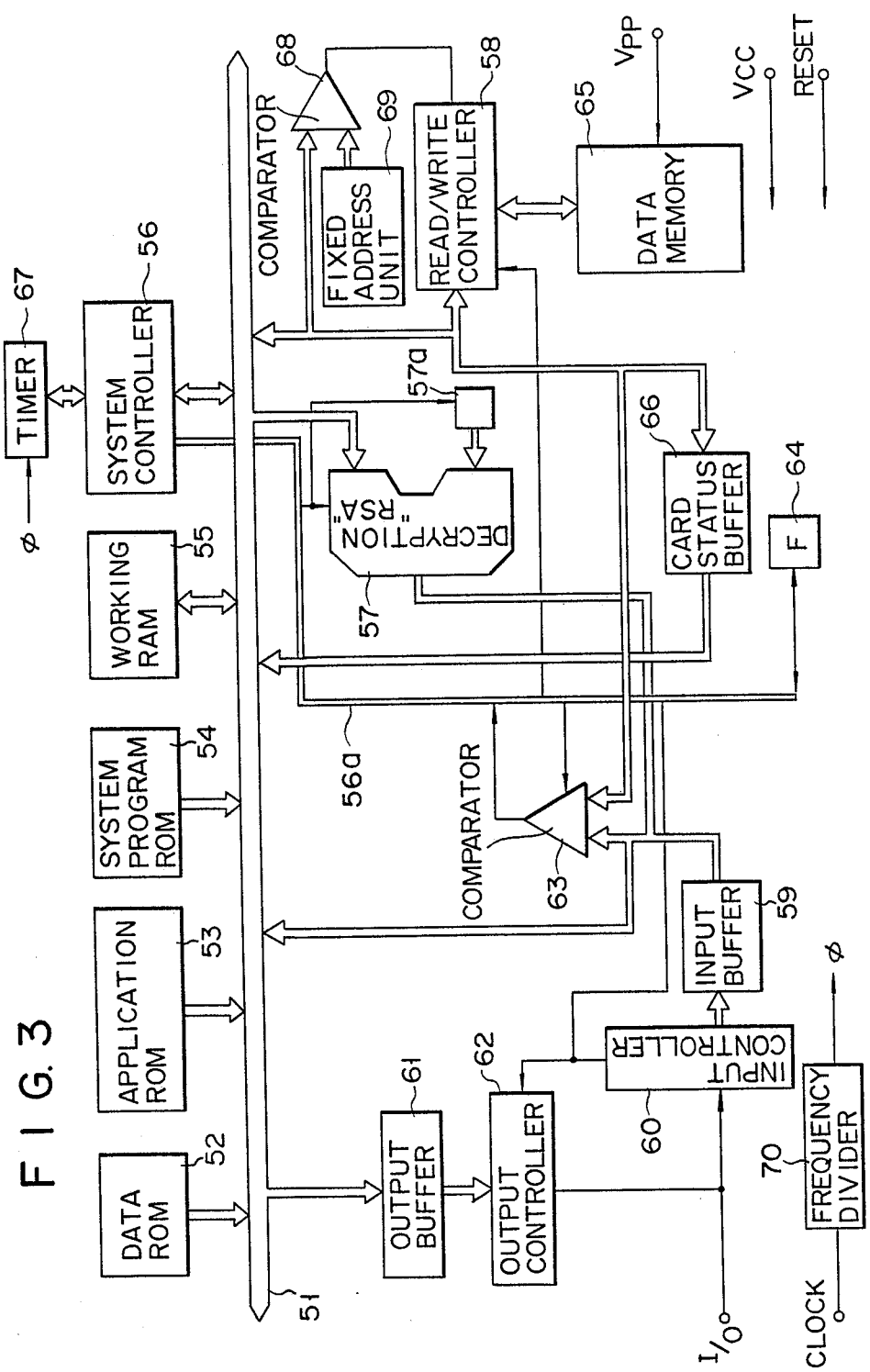
F I G. 3

INTERFACE BYTE (TC1)

INTERFACE BYTE (TDn)

INTERFACE BYTE (TA2)

1 ≦ BUFFER BYTE ≦ 255

INTERFACE BYTE (TB2)

100ms x 1 ≦ STANDBY INTERVAL ≦ 100ms x 255

INTERFACE BYTE (TC2)

$100ms \times "1" \leq VppT \leq 100ms \times 255$

TERMINAL CODE

EXPANSION  STATUS

FIG. 21

| COMMAND | READ | | | | | | WRITE | | | | | | | | COMPARE | | |
|---|---|---|---|---|---|---|---|---|---|---|---|---|---|---|---|---|---|
| ITEM / TERMINAL | CA | IPIN | PAN | CHN | EPD | TRAN | CA | PMK | IPIN | PAN | CHN | EPD | PIN | TRAN | PMK | IPIN | PIN |
| MANUFACTURER | | | | | | | ○ | ○ | | | | | | | | | |
| ISSUER | ○ | ○ | ○ | ○ | ○ | | | | ○ | ○ | ○ | ○ | | | ○ | | |
| CUSTOMER | ○ | | ○ | ○ | ○ | ○ | | | | | | | ○ | | | ○ | ○ |
| TRANSACTION | ○ | | ○ | ○ | ○ | ○ | | | | | | | | ○ | | | ○ |

SYSTEM FOR JUDGING PROPRIETY OF USE OF AN INTEGRATED CIRCUIT CARD WITH A CARD TERMINAL

BACKGROUND OF THE INVENTION

This invention relates to IC card systems which perform transactions with a combination of IC cards containing integrated circuits and card terminals.

The recent years have been called the "cashless era," by using cards issued by credit companies, etc., the purchase of goods without any handling of cash has been possible. Up to now, plastic cards, embossed cards, and magnetic stripe cards have generally been used, but these cards are easy to forge, and their misuse has been problematic. To solve this problem, an information card, called IC card has been developed. In this card, an IC circuit is contained in which a personal identification number is stored. Incorporated within this IC circuit is a personal identification number that is not easily read out from the outside. This IC card is advantageous in that it is difficult to duplicate, its secrecy maintenance capability is excellent, and it can store a great amount of data. Since the personal identification number is input directly by the card user, other persons, for example, a bank clerk, cannot find out the personal identification number. In this respect, the card has a very high security factor.

However, if something is wrong with the internal circuit of the IC card which is essential to data exchange between the IC card and the card terminal, an abnormality will occur in the data transfer. Therefore, erroneous data exchange and storage will be made, causing an error in the transaction.

SUMMARY OF THE INVENTION

Accordingly, an object of this invention is to provide an IC card system which prevents errors in transactions beforehand at the instant when trouble occurs in the internal circuit of the IC card or the card terminal, specifically in that such trouble can be detected before the data transfer occurs.

According to one aspect of this invention, there is provided an IC card system comprising means contained in an IC card, for storing the data setting the operating conditions of the IC card, means contained in a card terminal for operating the IC card according to the operating condition setting data from the IC card, means for exchanging a check signal for checking a compatibility of the IC card with the card terminal, between the IC card and the card terminal, and means for checking the compatibility between them on the basis of the received check signals.

According to another aspect of this invention, there is provided a method for checking the functions of IC cards and card terminals comprising the steps of storing the data for setting operating conditions of the IC card, operating the IC card according to the operating condition setting data as stored, exchanging a check signal for checking a compatibility of the IC card with the card terminal, between the IC card and the card terminal, and checking the compatibility of the IC card with the card terminal on the basis of each received check signal.

BRIEF DESCRIPTION OF THE DRAWINGS

FIG. 3 is a block diagram of an internal circuit of the IC card;

FIG. 21 shows a table illustrating relationships between the terminal code and the terminal command code in the terminal command checking operation;

DETAILED DESCRIPTION OF THE PREFERRED EMBODIMENTS

Figure 1:
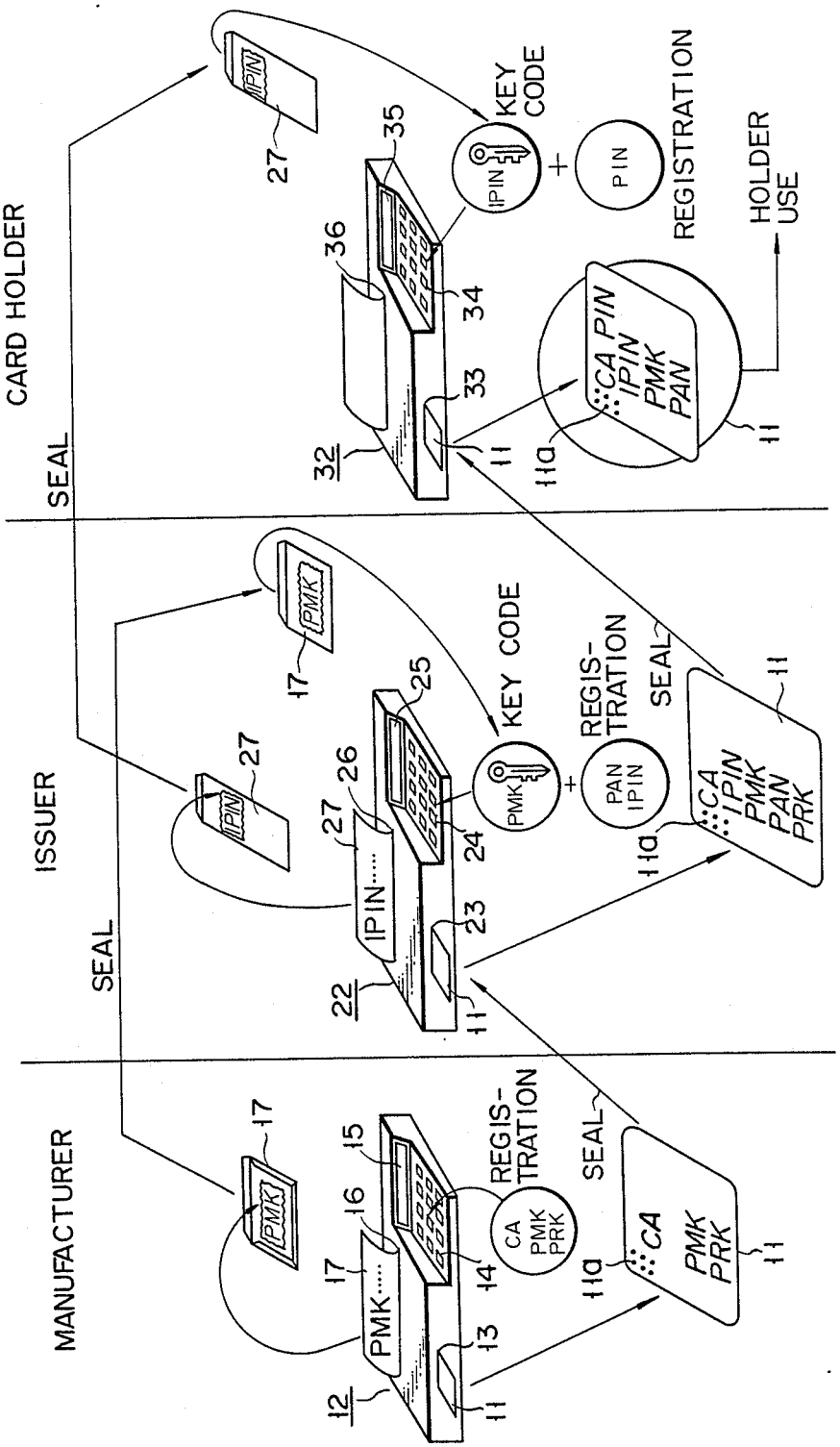
FIG. 1 shows a diagram illustrating a sequence of manufacturing and issuing of IC cards, and registration of personal identification numbers (PINs) in an IC card system according to one embodiment of this invention.

An embodiment of this invention will be described with reference to the accompanying drawings. In FIG. 1, there is shown a flow of the IC card and the card identification data in which the IC card is manufactured and then given to an issuer, for example a bank, the card is then issued to a card owner. The IC card manufacturer produces IC card 11, and card terminals 12, 22, 32, and 41.

The card manufacturer, after producing IC card 11, writes a predetermined code into the card 11 by using IC card manufacturing terminal 12. As will be described in detail later, this IC card 11 contains an internal IC circuit and is provided with connector or connection terminals 11a on the surface of its case. When the card 11 is inserted in IC card manufacturing terminal 12, these connection terminals 11a makes contact with the internal circuits of terminal 12. The card manufacturing terminal 12 contains card insertion slot 13, keyboard 14, display panel 15, and printer section 16. With data input from keyboard 14 by an operator, the different kinds of codes, such as CA, PMK, and PRK, are written into IC card 11. The CA (Card Authenticator) is of a random 64-bit code and is used in the encryption and decryption of messages. PMK (Production Master Key) is a manufacturing number code, and the same PMK is used on all IC cards of one group, such as one lot unit, and is kept secret even in the factory. PRK (Private Key) is a decryption code, which, as will be explained later, corresponds on a one to one basis to the Public Key code, or encryption code which is written into the card terminal. When a given code is written into the IC card by the IC card issuing terminal 12, the PMK only is printed on a security code printing paper 17 by printer section 16. Then, the manufacturer seals the IC card 11 and the security code paper 17 in the same envelope or in different envelopes, and mails them to the issuer. When IC card 11 and paper 17 are sealed in the same envelope, this envelope should be sent via a security mail such as a registered mail. The issuer inserts the IC card 11 as he received from the manufacturer into IC card issuing terminal 22, then reads out the recorded PMK code on the security code paper 17, and inputs the corresponding PMK code into IC card issuing terminal 22. Also, the issuer inputs the primary account number (PAN) and IPIN (initialization personal identification number) for the IC card 11, into IC card issuing terminal 22. This IPIN is, for example, a 6-bit random code which is used as an identification number until a personal identification number PIN is used. IC card issuing terminal 22, like IC card manufacturing terminal 12, is provided with card insertion slot 23, keyboard 24, display panel 25, and printer section 26. The PMK code which has been written into IC card 11, and the PMK code input from keyboard 24 are compared for coincidence, and only if both codes coincide with each other, the account number PAN is written into IC card 11, and the input IPIN is printed on the security code paper 27. Then, the issuer places the IC card with the PAN as written and the security code paper with the printed IPIN in the same envelope or in separate envelopes, and sends them to the card user. When the card user receives the IC card 11 and the security code paper 27 from the issuer, he or she goes to the card issuing point, inserts his or her card into the IC card user terminal 32, which is installed there, and then reads the recorded contents from the security code paper 27 he or she received from the issuer, and code inputs them into IC card user terminal 32. The card receiver also inputs the personal identification number (PIN) of his or her choice into IC card user terminal 32. IC card user terminal 32, like the IC card issuing terminal 22, is equipped with card insertion slot 33, keyboard 34, display panel 35, and printer section 36. The IPIN written in IC card 11 and the IPIN input from keyboard 34 are compared for identification, and only if they coincide, the above-mentioned PIN is written into IC card 11. As a result of the above procedure, the issuing of this IC card 11 is complete, and card 11 can now be put to actual use. Beyond this step, further details are referred to in U.S. Ser. No. 645,925 filed Aug. 30th, 1984. No further explanation will be given here.

External View and Mounting of the Terminal

Figure 2:
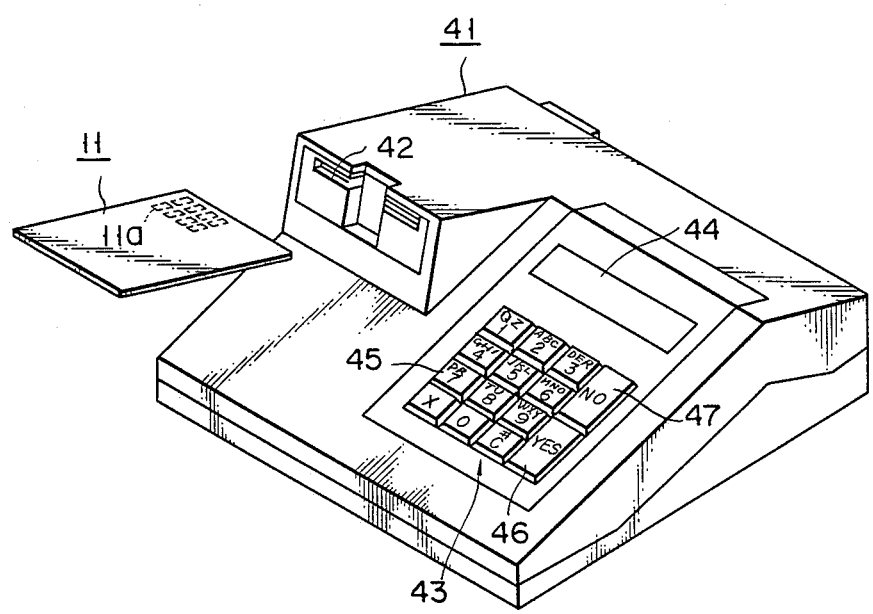
FIG. 2 shows an external view of the IC card and the card terminal in the IC card system.
Figure 2A:
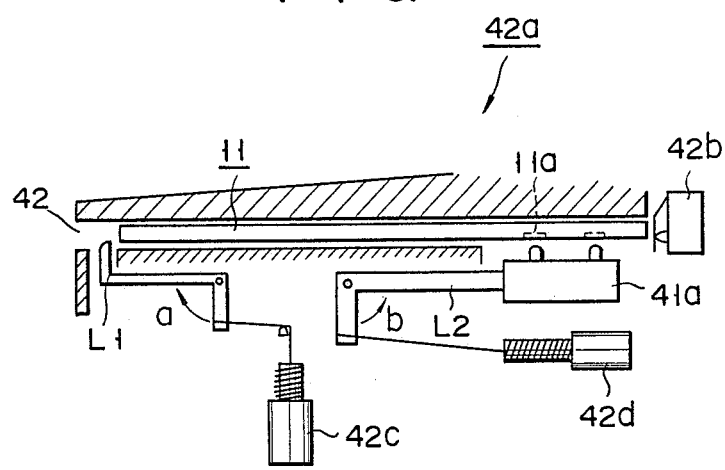
FIG. 2A shows a cross sectional view of the IC card receiving section in the card terminal.

FIG. 2 shows the outer appearance of a card terminal device 41 used for IC cards 11, which may be installed in a store, for example, when the terminal device for IC cards is realized according to this invention. This card terminal 41 is composed of card insertion slot 42, keyboard 43, and display section 44. FIG. 2A shows the card receiving section 42a corresponding to card insertion slot 42, which is inside terminal 41. This card receiving section 42a uses card insertion detector section 42b, card-lock/detector 42c, and card connection/detector 42d. Card insertion detector 42b contains a microswitch for detecting whether or not IC card is inserted into card insertion slot. Card-lock detector 42c, containing a sensor (not shown) and a solenoid, reliably locks the inserted card 11, and senses the locked state by means of a sensor. Card connection/detector 42d, containing a solenoid, detects if contact probe 41a of terminal 41 is reliably in contact with connector (connection terminal) 11a provided on the reverse side of card IC card 11. The keyboard 43 uses numerical keys 45, yes key 46, and no key 47. The internal circuits of this card terminal 41 will be explained in detail later.

IC Card Circuit Configuration

The configuration of the internal IC circuits of the IC card 11 will be described referring to FIG. 3.

In the figure, system bus 51 is shown. Data ROM 52, application ROM 53, system program ROM 54, working RAM 55, system controller 56, decryption arithmetic unit 57, and read/write controller 58 are all connected to system bus 51. Input controller 60 is connected to this bus via input buffer 59, and output controller 62 is connected to this bus 51 via output buffer 61. Data input/output terminal I/O is connected to input controller 60 and output controller 62.

The above-mentioned ROM 52 stores all the operating conditions pertaining to the card 11 itself, such as data write applied voltage, its current tolerance value and maximum application time, maximum data transmission capacity, and maximum response waiting time. When the initialization of the card itself is finished, this condition data, in conformance with a preset format, is sent to the terminal 41 side as "answer-to-reset" data. The above application ROM 53 stores card classification data APN (application name), which shows the classification of this card 11. The card classification data is put into a specified format and sent out when the attribute exchange occurs with terminal 41, after initial parameters have been set in accordance with the answer-to-reset data. System program ROM 54 contains (besides every kind of system program) ACK and NAC codes, which show if the signal transmitted from terminal 41 is correct or not. System controller 56 has an internal decision area, and outputs operating commands to related circuits in accordance with the data receive signal transmitted via input buffer 59 and operation status. Decryption arithmetic unit 57 performs decryption in accordance with RSA algorithm, and it decrypts input data supplied from the terminal 41 side via input buffer 59, by means of the decryption key code (issuer's private key) stored in key code memory ROM 57a, and outputs it to comparator 63. The comparator output of this secret information comparator 63 is supplied to system control line 56a of system controller 56. This system control line 56a is connected to flag 64, which operates in accordance with the comparison results from the comparator 63. Read/write controller 58 controls the write-in or read-out of data relating to data memory 65 in accordance with the commands from system controller 56. The memory data read out by this read/write controller 58 is output to comparator 63, system bus 51, or card status buffer 66. EEP-ROM, for example, is used for this data memory 65. The codes CA, IPIN, PAN, CHN, EPD, PRK, and RTN, and status data ST are written into this memory area. The CHN is an abbreviation of "card holder's name". EPD is an abbreviation of "expiration date". RTN is the number of times that re-entry has been performed when incorrect data was input. Also, ST shows the current status of card 11. For example, if the manufacturing process of this card has been completed, manufacturing process data is written in, and even if the card has been issued, and the PIN has not been entered, PIN not entered data is written in. The card status data ST, is arranged in the same format as the card classification data APN as stored in application ROM 53, and sent to the terminal 41 side. The above data memory 65 is not limited to use with EEP-ROM, but as an alternative, may also use EP-RO, for example.

The system controller 56 is connected to timer 67. This timer 67 counts a predetermined time during normal data exchange processing when a start data write voltage supply message is output by card terminal 41. During the count operation of this timer 67, if a positive response signal ACK is not supplied from terminal 41, system controller 56 will stop the data input/output for this card 11. Address comparator 68 is connected to the bus line which connects read/write controller 58 and system bus line 51. This address comparator 68 always compares the unused specific address entered in fixed address unit 69 at the end of the test following completion of manufacture, and the specific address specified via system bus 51. The result of the comparison by comparator 68 is supplied to read/write controller 58. In this way, only when the comparing output is the address coincident signal due to unauthorized use of the terminal, it clears all of the data in data memory 65, thereby preventing secret data from being read out of the card. In a situation that the, IC card 11 is coupled with card terminal 41, terminal 41 supplies a reset signal RESET and a system clock signal clock through connector (connection terminal 11a to the IC card. Vcc and Vpp power supplies are also supplied to it. Vcc power source is a system drive power source, and Vpp power supply is used for the data writing to data memory 65. The power voltage is set up by the terminal side on the basis of the answer to reset data as stored in data ROM 52. The system operation signal based on a system clock is supplied through frequency divider 70.

Terminal Circuit Configuration

Figure 4A:
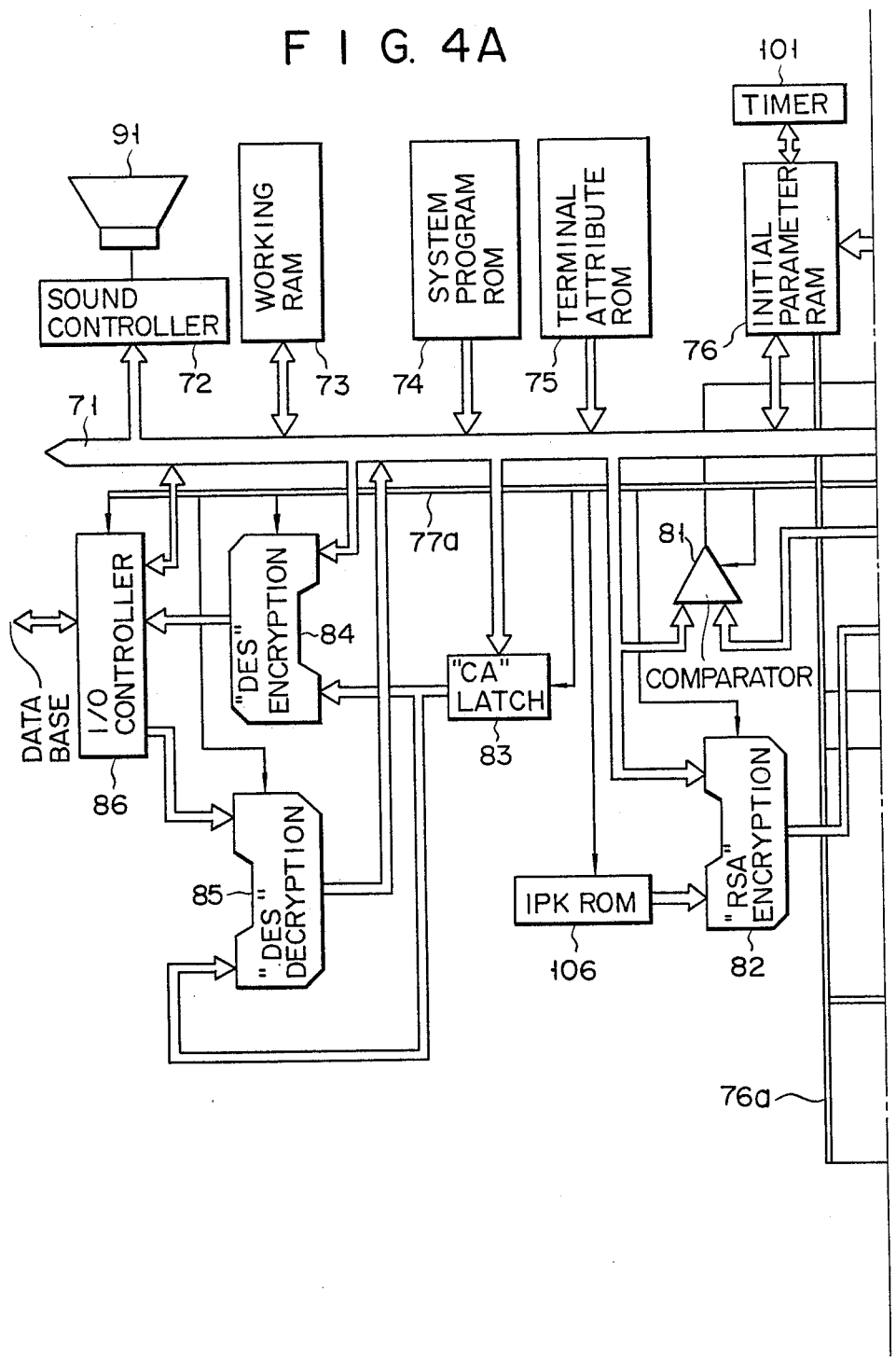
FIGS. 4A and 4B show, in combination, a block diagram of an internal circuit of the card terminal.
Figure 4B:
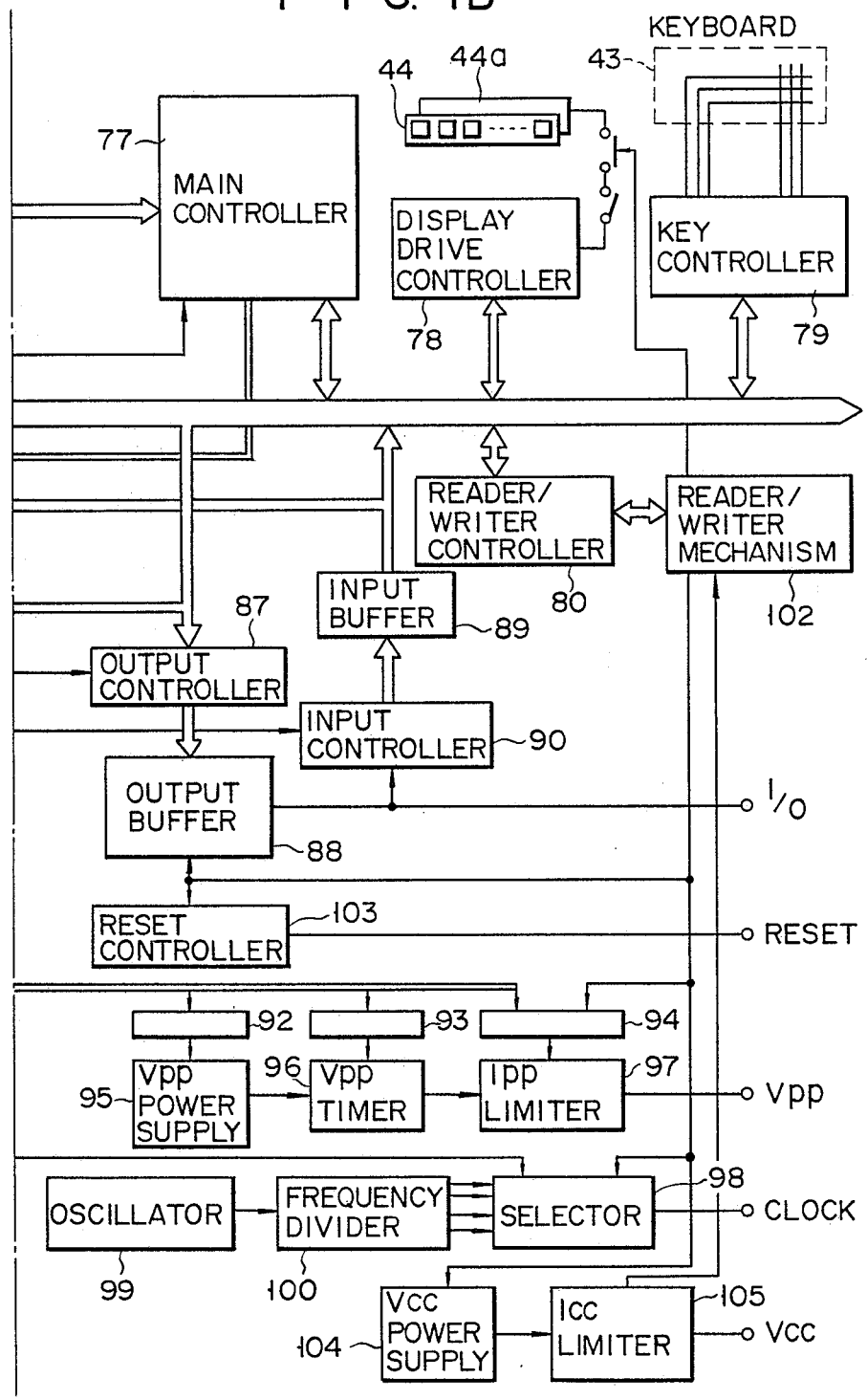

A circuit configuration of card terminal 41 will be given referring to FIGS. 4A, 4B.

In the figure, system bus 71 is coupled with sound controller 72, working RAM 73, system program ROM 74, terminal attribute ROM 75, initial parameter RAM 76, main controller 77, display drive controller 78, key controller 79, read/write controller 80, comparator 81, encrypting arithmetic unit 82 based on "RSA" algorithm, latch circuit 83 for latching "CA", encrypting arithmetic unit 84 of the DES system based on data encryption standard, descrypting arithmetic unit 85 of DES system, input output (I/O) controller 86, and output buffer 88 through output controller 87, and input controller 90 through input buffer 89.

Sound controller 72 is coupled with speaker 91 for sounding an alarm if such a situation occurs. The memory area of working RAM 73 stores "PAN", "CHN", and "EPD" as sent from IC card 11, and further various types of data processed in terminal 41. System program ROM 74 contains various types of system programs, and "ENQ (enquiry)" code for taking matching to IC card 11. Terminal attribute ROM 75 stores terminal code "TC" (manufacturing code, issuing code, shop code, etc.), according to the use of the terminal. Terminal code "TC" is transmitted in a predetermined format, after the setting of the initial parameters according to the answer-to-reset data from code 11, and when an attribute exchange with the code 11 side is performed. Then, the answer-to-reset data from the IC card 11 side is stored in its entirety by initial parameter RAM 76. This initial RAM 76 is connected to output controller 87, input controller 90, Vpp level latch unit 92, Vpp timer latch unit 93, and Ipp level latch unit 94 via initial data transmission line 76a. Also, each latch unit is connected to its corresponding Vpp power supply 95, Vpp timer 96, or Ipp limiter 97. The output of the Vpp power supply is connected to the Vpp output terminals by way of Vpp timer 96 and Ipp limiter 97 successively. The maximum data transmission capacity of card 11, which is controlled by main controller 77, the card data maximum write voltage by Vpp power supply 95, the write voltage supply time by Vpp timer 96, and the card data maximum write current by Ipp limiter 97 are all set by the answer-to-reset data as all set in initial parameter RAM 76.

IC card operating frequency selector 98 is connected to the data transmission line 76a. The oscillating signal from oscillator 99 is supplied to this selector 98 via frequency divider 100. The oscillating signal with a predetermined frequency is outputted from the clock terminals. Also, timer 101 is connected to the above initial parameter RAM 76. This timer 101 counts the maximum response waiting time from an instance that an enquiry signal "ENQ" or other command signals is sent from the terminal 41 side to the the card 11 side, according to the answer-to-reset data as sent from the IC card 11 and stored in initial parameter RAM 76. During this waiting time, if some kind of response signal is not received from the card 11 side, main controller 77 again directs the transmission of the above ENQ or other command signal, or directs via reader/writer controller 80 that reader/writer mechanism unit 102 be disconnected from card 11. It is assumed that the card receiving section 42a is included in the reader/writer mechanism unit 102.

System control line 77a of main controller 77 is connected to comparator unit 81, decryption arithmetic unit 82, latch circuit 83, and input/output controller 86. According to the operation status of the system, control commands are sent to every circuit unit from main controller 77. Display drive controller 78 controls display section 44 and back light 44a constructed with EL elements provided on the rear side of display section 44. This back light 44a lights only when IC card 11 is inserted into the read/write mechanism 44. Key controller 79 provides a key sampling signal to keyboard 43, and detects the key input signal. Then, reader/writer controller 80 controls the operation of reader/writer mechanism unit 102. This reader/writer mechanism unit 102 is provided with a card conveying motor, which conveys card 11 from card insertion slot 42 to a specified location, and after completion of the given processing, returns card 11 to card insertion slot 42. This unit 102 is further connected to output buffer 88, reset controller 103, Ipp level latch 94, operation frequency selector 98, and Vpp power supply 104. The terminals corresponding to these units, I/O, Reset, Vpp, clock, and Vcc are set at high impedance only when IC card 11 is not inserted. In this case, when IC 11 card is inserted, first the supplying of power supply voltage is begun by Vcc power supply 104. At the start of this voltage supply, if an abnormal current with a value above a certain level flows, a card reject signal is output to reader/writer mechanism unit 102 from $I_{CC}$ limiter 105. The above terminals I/O, Reset, Vpp, clock, and Vcc are all connected to the contact probe 41 of card receiving unit 41a as shown in FIG. 3.

Output controller 87, which is connected to input terminals I/O via input controller 90 and output buffer 88, controls the transfer of data between card terminal 41 and IC card 11, according to the command received from main controller 77 via initial parameter RAM 76. The input controller 90 outputs the data from IC card 11 via input buffer 89 to memory device units, such as working RAM 73. Output controller 87 sends the data received from the memory device of terminal attribute ROM 75 to the IC card 11 side via output buffer 88. Data input from the IC card 11 via input buffer 89 is sent to comparator 81 via the bus line, and the output of that comparator is supplied to main controller 77. Further, the above output controller 87 sends the decryption data as received from encrypting arithmetic unit 82, to IC card 11 via output buffer 88. Encrypting arithmetic unit 82 encrypts the data (PAN) from working RAM 73 via system bus 71, according to the public key code received from IPK (Issuer's public key) ROM 106 as data ROM. The public key code which corresponds to the PRK stored in data memory 65 of IC card 11, is already written into IPK ROM 106. In response to a command from main controller 77, this memory code is outputted.

"CA" latched in latch circuit 83 is inputted to encrypting arithmetic unit 84 and decrypting arithmetic unit 85. Given data is inputted to encrypting arithmetic unit 84 via system bus 71. "PAN" stored in working RAM 73 is encrypted, with the key of "CA", in response to the command from main controller 77, and outputted to input/output controller 86. The data base, i.e. the encrypted data is output to the host computer, when it is connected in on-line manner. This input/output controller 86 outputs the data base, in other words, data which is encrypted when the host computer is on line, to the host computer. Input/output controller 86 decrypts the encrypted data from the host computer according to the C A by decrypting arithmetic unit 85, and outputs it to system bus 71.

[Operation of an Embodiment of this Invention]

The operation of the IC card terminal device thus arranged will be explained.

Figure 5:
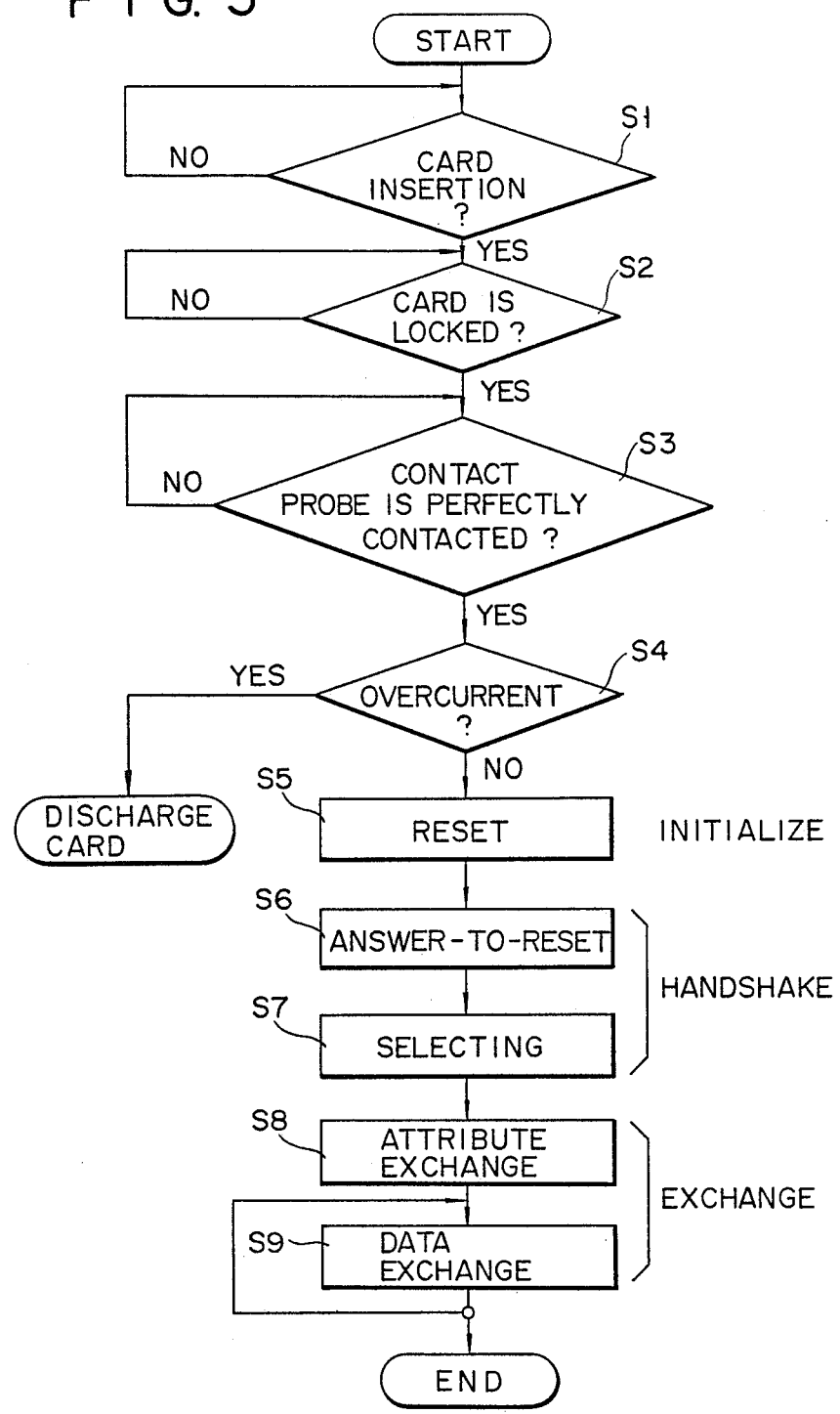
FIG. 5 shows a flowchart illustrating a flow of the overall operation of the IC card system.

First, as shown in FIG. 1 above, the IC card 11 is manufactured and issued, and the PIN of the user has been registered. For purchasing goods from a store with this IC card, the user inserts the card into a card terminal 41, as shown in FIG. 2. A processing operation based on the flowchart of FIG. 5 is started.

Card Insertion

In the description to follow, IC card is a credit card. In case the card holder (customer) is making a shop purchase, he first inserts the card into the card insertion slot 42 of the card terminal 41 installed in the shop's counter. In step S1 in the flowchart, card terminal 41 determines if IC card 11 is reliably inserted into card receiving section 42a in FIG. 2A. This determination is made by main controller 77 through reader/writer mechanism unit 102 and reader/writer controller 80. In step S1, the answer is YES, that is, the insertion detector unit 42b of card receiving section 42a operates. After the completion of the insertion of IC card is verified, the control goes to step S2. In step S2, if the answer is YES, the card lock rod L1 of card receiving section 42a is turned in the direction of arrow "a" and card lock/detector 42c operates, and it is checked if the inserted card is locked or not. Following the check, the control proceeds to step S3. In step S3, it is determined if connector unit 11a of IC card 11, which has been inserted and locked, is properly connected to contact probe 41a of the terminal side or not. In this step S3, the answer is YES, contact load L2 of card receiving unit 42a turns in the direction indicated by the arrow "b", card connection detector 42d operates, and when the connection complete status of IC card 11 is verified, the control moves to step S4.

Card Connection Status Detection

After the card is set to terminal 41, and its internal circuit is connected to that of the terminal, first of all, Vcc power supply 104 produces a test voltage (much lower than a normal voltage for the initial setting given later), and supplies it to IC card 11. Then, in step S4, it is determined if an overcurrent flows in the power supply by Icc limiter 105 of the terminal 41 side. Here, if the answer is NO, that is, the current flowing in the above Icc limiter 105 does not exceed a predetermined value, and the connection status of IC card 11 is verified to be proper, then the control goes to the steps following the next initialize reset.

In step S4, if the answer is YES, it is detected that the value of the current supplied to Icc limiter 105 exceeds the predetermined value, and it is verified that the connection status of IC card 11 is not stable. Then, Icc limiter 105 supplies a card reject command signal to reader/writer mechanism unit 102. Upon receipt of this, reader/writer mechanism unit 102 performs the noncontact operation. The card lock is cancelled, and IC card 11 is flipped by a plunger (not shown) and rejected from terminal 41. Then, in steps S1 to S3, the setting status of card 11 to terminal 41 is observed. If a proper connection of IC card 11 in step S4 is again not obtained, the proceeding to the steps following the next step is prohibited. The prevention of the supplying of an operation signal in the unstable connection state of IC card 11 is accomplished. Further, undesirable effects from the bad connections of the card circuits are prevented.

Initial Processing in Step S5

Figure 6A:
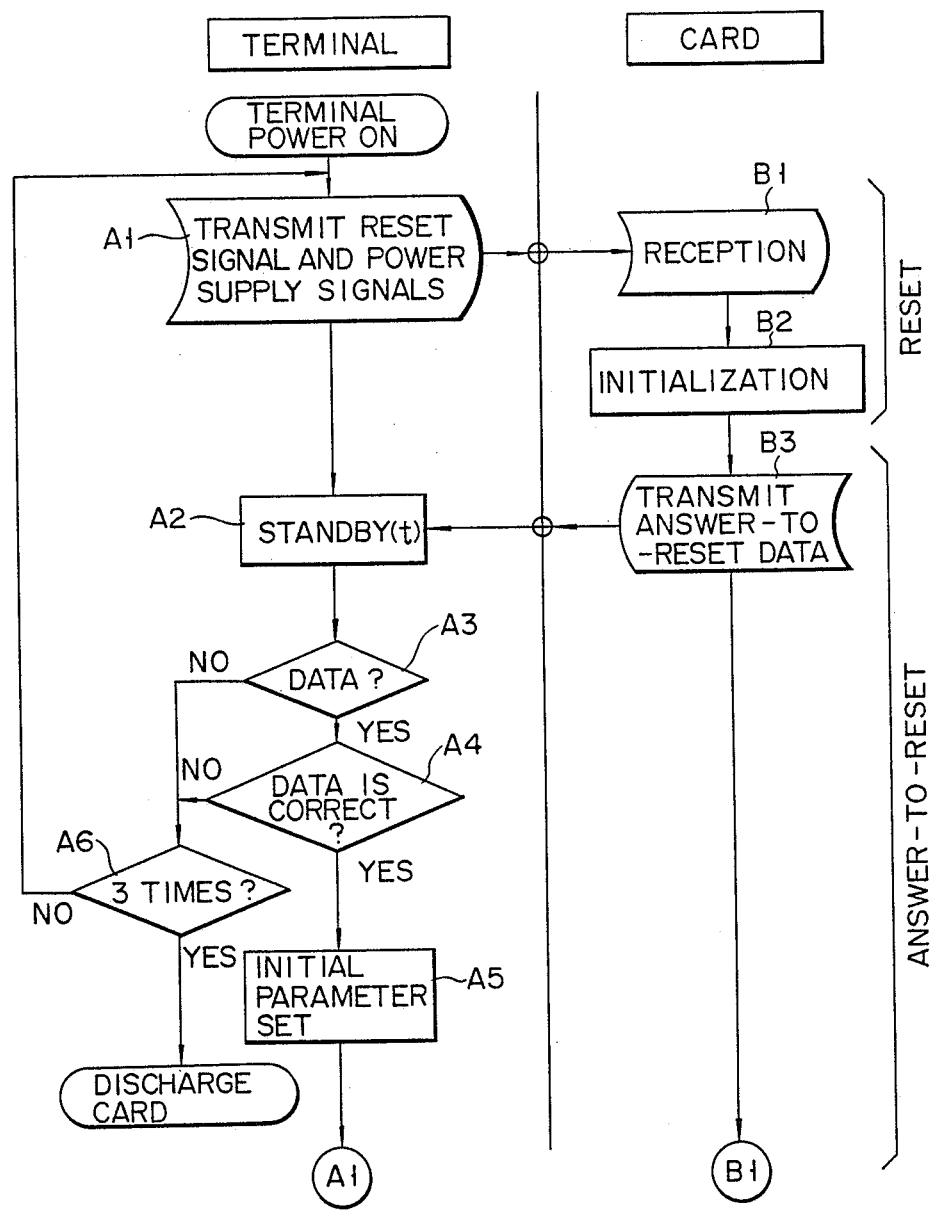
FIGS. 6A, 6B and 6C show, in combination, a flowchart of the overall operation of the IC card system, using comparatively the operations of card terminal and the IC card.

Through the card setting and connection status detection processes, if a stable connection state is obtained, a predetermined initializing signal, as shown in step A1 of FIG. 6A, is sent from card terminal 41 to IC card 11. This initialization signal, under control of main controller 77, sets the input/output terminal I/O to H (high) level, reset terminal from L (low) to H level, the Vcc and Vpp terminals each to 5V, and the clock terminal clock to 4.9152 MHz. This initialization signal is sent to the card 11 side, and received by way of the corresponding terminals, I/O, Reset, Vpp, Vcc and clock terminals. Then, in step B2, IC card starts under operation conditions based on the initialization signal.

Answer to Reset Process of Step S6

In step B3, IC card 11 having started the initial operation in this way, under the control of system controller 56, reads out the answer to reset data already stored in data ROM 52, and sends it from I/O terminal to the terminal 41 side via system bus 51, output buffer 61, and output controller 62.

In this case, if it is determined by main controller 77 that the answer-to-reset data sent from terminal 41 to card 11 has been read into initial parameter RAM 76, main controller 77 distributes and sets this answer-to-reset data into each corresponding circuit, as operating conditions setting data. The operating frequency setting data for IC card 11 is set in operating frequency selector 98. The write voltage setting data for data memory 65 and the maximum tolerable write current setting data are set in Vpp level latch unit 92 and Ipp level latch unit 94. The setting data for the maximum data transmission capacity for card 11 is set in main controller 77 itself, and the response signal waiting time setting data is set in timer 101. The voltage application time data is set in Vpp timer latch unit 93. Therefore, the maximum data transmission capacity controlled by main controller 77, the data write voltage determined by Vpp power supply 95, the data write continuous application time determined by Vpp timer 96, the data write tolerable current determined by Ipp limiter 97, and the card operating frequency determined by operation frequency selector 98, are set to the values as specified by the operating conditions dedicatedly for card 11 now set, on the basis of the answer-to-reset data written in initial parameter RAM 76.

The contents of the answer-to-reset stored in data ROM 52 and the details of the operation of the answer-to-reset will be described with reference to FIGS. 7 through 16.

Figure 7:
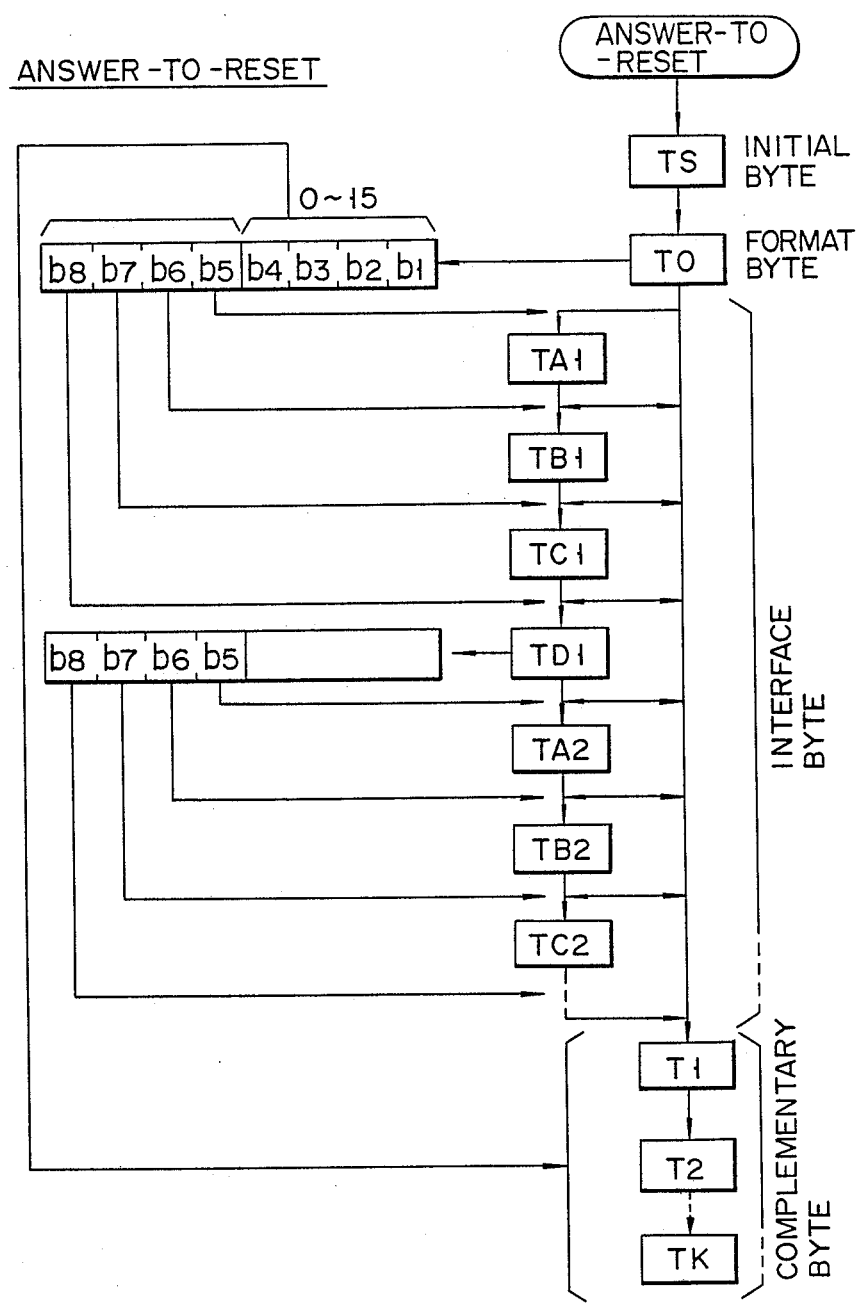
FIG. 7 shows a diagram illustrating a configuration of answer-to-reset data stored in the IC card.
Figure 8:
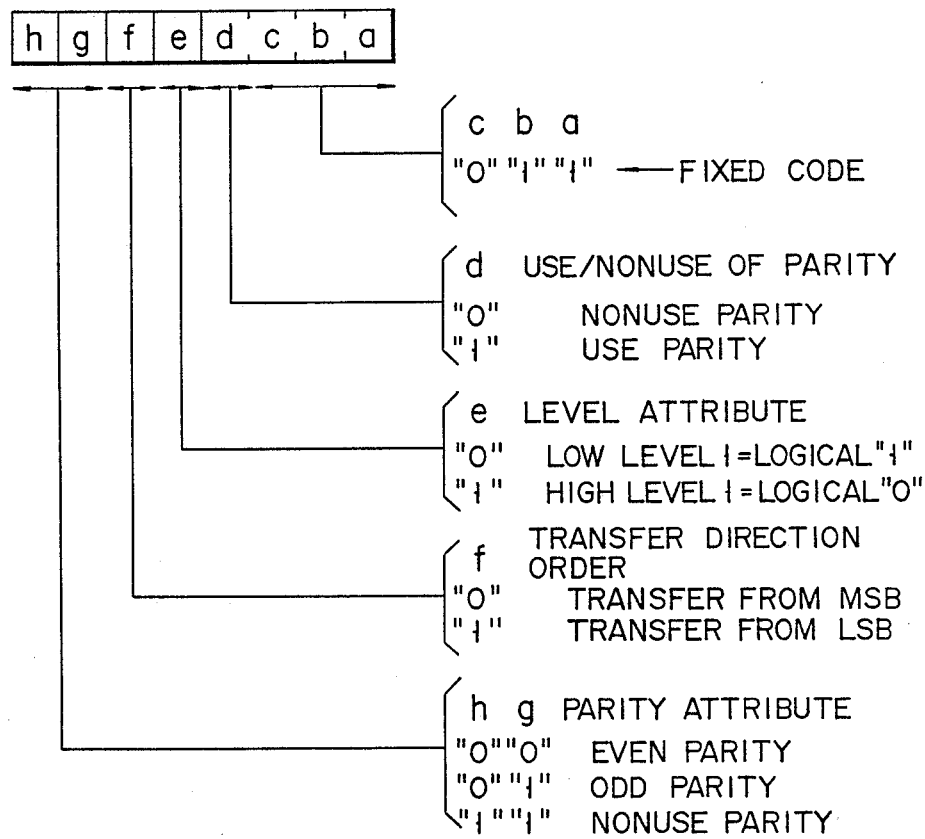
FIG. 8 shows a diagram illustrating the code contents of an initial byte in FIG. 7.
Figure 9:
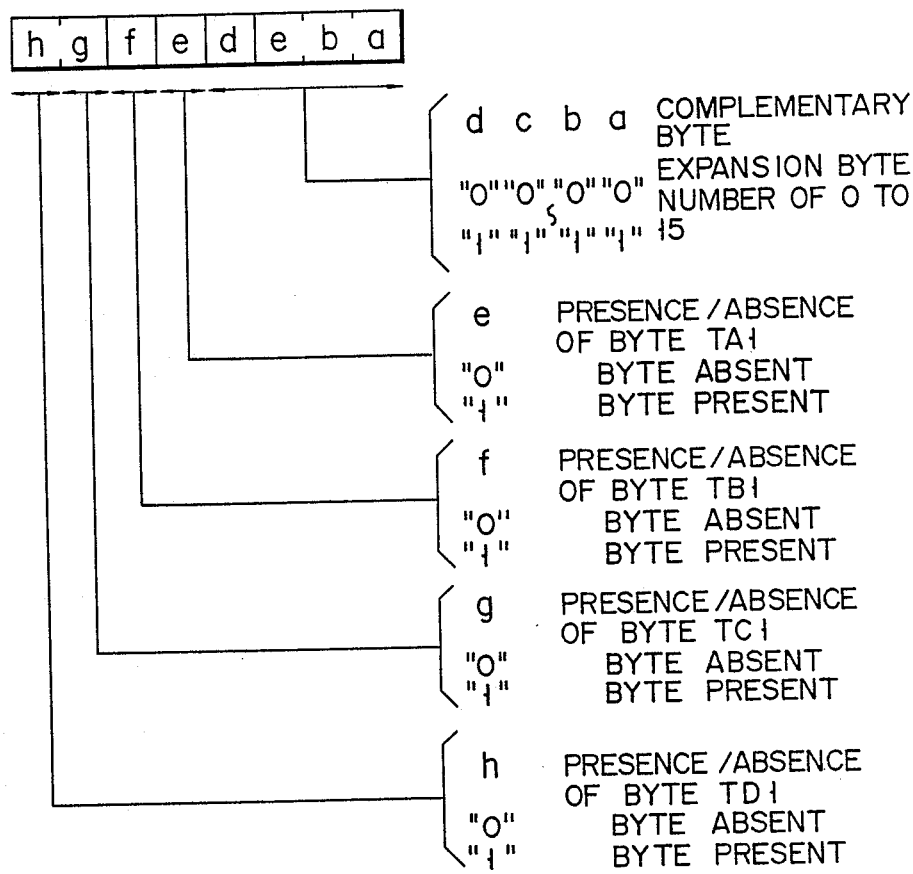
FIG. 9 shows a diagram illustrating the code contents of a format byte T0 in FIG. 7.
Figure 10:
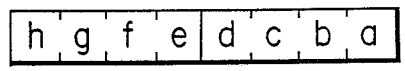
FIG. 10 shows a diagram illustrating the code contents of an interface byte TA1 in FIG. 7.
Figure 11:
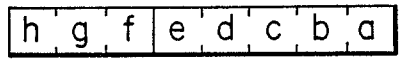
FIG. 11 shows a diagram illustrating the code contents of an interface byte TB1 in FIG. 7.
Figure 12:
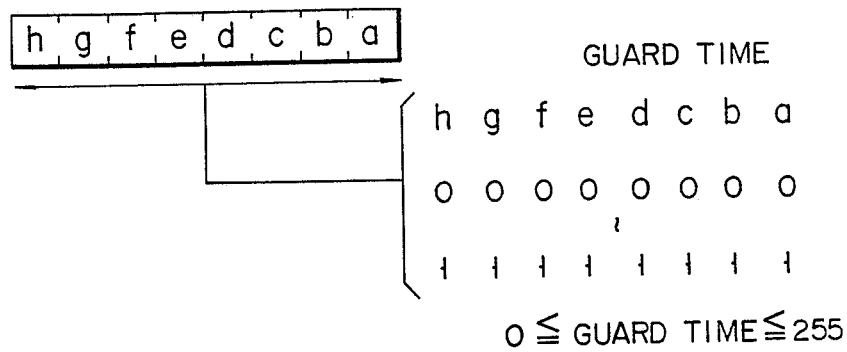
FIG. 12 shows a diagram illustrating the code contents of an interface byte TC1 in FIG. 7.
Figure 13:
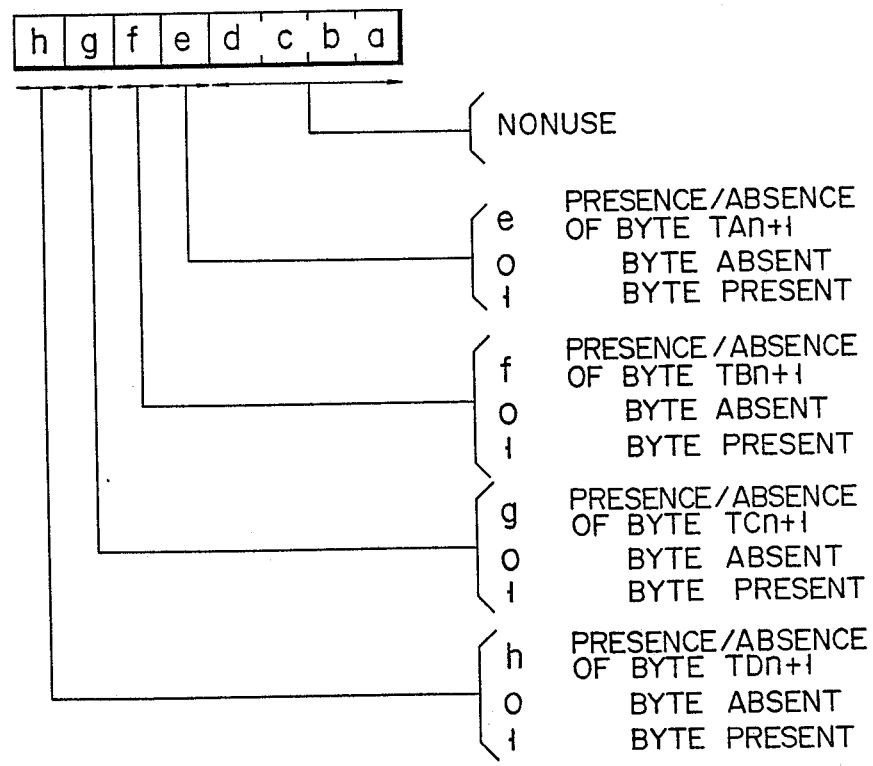
FIG. 13 shows a diagram illustrating the code contents of an interface byte TDn in FIG. 7.
Figure 14:
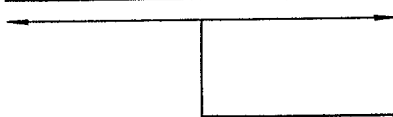
FIG. 14 shows a diagram illustrating the code contents of an interface byte TA2 in FIG. 7.
Figure 15:
FIG. 15 shows a diagram illustrating the code contents of an interface byte TB2 in FIG. 7.
Figure 16:
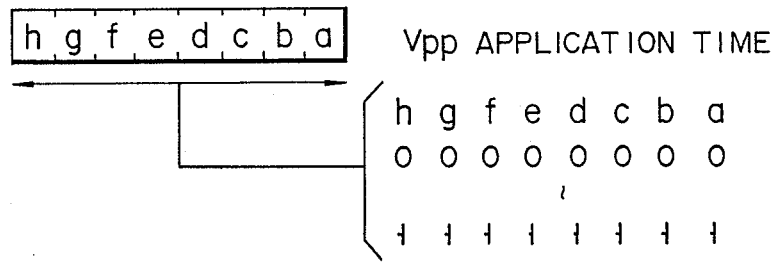
FIG. 16 shows a diagram illustrating the code contents of an interface byte TC2 in FIG. 7.

FIG. 7 shows the overall configuration of the answer-to-reset data stored in data ROM 52. In the figure, the operation condition data for IC card 11 are expressed with interface bytes TA1, TB1, TC1, TA2, TB2, and TC2. The presence or not of these condition data is expressed by format byte TO. TD1 indicates the presence or not of the condition data succeeding to data TA2. Initial byte TS is the initialization data when these condition data are transferred. Complimentary bytes T1, T2, ..., and TK are used when the condition data of this card 11 is increased. The initial byte TS, format byte TO, and the interface byte have each the 8-bit data format. FIG. 8 illustrates the code contents of initial byte TS. Of the eight bits codes a through h, a, b, and c are fixed code bits, d indicates the use/nonuse of parity, e the level attribute, f the transfer direction order of the data, and g and h the parity attribute. FIG. 9 shows the code contents of format byte TO shown in FIG. 7. Bits a, b, c, and d indicate the number of complementary bytes T1, ..., T2, and TK, e the presence/absence of condition setting data in interface byte TA1, f the presence/absence of interface byte TB1, g the presence/absence of byte TC1, h the presence/absence of byte TD1, viz. this bit indicates the presence/absence of any condition setting data after interface byte TA2. FIG. 10 shows the interface byte TA1 in the above FIG. 7. Of this 8-bit code, a, b, c, and d form the bit area for setting the data transfer rate of card 11, and e, f, g, and h form the bit area for setting the operation frequency of card 11. FIG. 11 shows the interface byte TB1 shown in FIG. 7. In this 8-bit code, a through e form the bit area which sets the data write voltage for this card 11. This voltage can be set in the range of Vpp=5V to 25V, depending on the type of card used. Bits f, g and h form the bit area which sets the tolerable current value of the data write current of data memory 65. The current can be set in the range of Ipp=50 mA to 100 mA depending on the type of the card. In this embodiment, the value of Ipp is set to either 50 mA or 100 mA; however, the specified current value can be set to an optional point within this range. FIG. 12 shows the interface byte TC1. Of this 8-bit code, all of the bits a to h form the area for setting the data transfer guard time of this card 11. FIG. 13 shows the interface byte TDn. In this 8-bit code, the bits a through d are nonuse bits, and the bits e, f, g, and h show the presence/absence of condition setting data in bytes TAn1, TBn1, TCn1, and TDn1, respectively. FIG. 14 shows the interface byte TA2 of FIG. 7. In this 8-bit code, all 8 bits form area for setting the maximum tolerable data transfer capacity for this card 11. Depending on the read-in capability of the card, it can be set within a range of 1 to 255 bytes. FIG. 15 shows the interface byte TB2, as shown in FIG. 7. In this 8-bit code, all 8 bits form an area which sets the response signal waiting time of this card 11. Depending on the data processing capability of the card, this time can be set from 100 to 25,500 ms. FIG. 16 shows the interface byte TC2. In this 8-bit code, all the bits a through h form an area for setting the maximum continuous application time of the data write voltage Vpp of this card 11, and depending on the data write capabilities or the dielectric properties of the card used, can be set to 100 to 25,500 ms.

As described above, the answer-to-reset data, composed of initial byte TS, format byte TO, interface bytes TA1, TB1, TC1, TD1, TA2, and TK, are received in the standby mode by the terminal 41 side. In this case, it is determined in step A2 if the answer-to-reset data was received within the data standby time (100 ms for instance) initially set or not. In step A3, if the answer is YES, and main controller 77 determines that the answer-to-reset data has been written into initial parameter RAM 76 via I/O terminal, input controller 90, input buffer 89, and system bus 71, the control moves to step A4 and main controller 77 further determines if the data written in initial parameter RAM 76 correctly corresponds to this terminal 41. When the answer to step S4 is determined to be NO, the control goes to step S5, and main controller 77 distributes and sets in all the interface bytes in initial parameter RAM 76 to each corresponding circuit, as operation condition setting data, In other words, the operation frequency setting data for IC card 11 which corresponds to interface byte TA1, is set into operation frequency selector 98 via data transfer line 76. Also, the write voltage data and maximum tolerable write current setting data for data memory 65, which correspond to interface byte TB1, are set respectively into Vpp level latch unit 92 and Ipp level latch unit 94. Then, the maximum data transmission capacity data for IC card 11 corresponding to interface byte TA2, is set into main controller 77 itself, and the response signal waiting time setting data corresponding to TB2, is set into timer 101. In this case, the predetermined data waiting time as set in timer 101 in step A2 is re-written into an inherent waiting time for the IC card presently connected. Further, the write voltage application time setting data for data memory 65, which corresponds to interface byte TC2, is set into Vpp timer latch unit 93. Due to this, the maximum data transfer capacity controlled by main controller 77, the data write voltage determined by Vpp power supply 95, the data write voltage continuous application time determined by Vpp timer 96, the data write tolerable current determined by Ipp limiter 97, and the card operation frequency determined by operation frequency selector 98, are all set into the values corresponding to the operating conditions specific to card 11, on the basis of the answer-to-reset data written into initial parameter RAM 76. As a result, even if the operation conditions of data write voltage Vpp and its continuous application time, the tolerable current Ipp or data write capability, or response capabilities differ with each card, if card 11 has the data transfer function of the answer-to-reset data and the terminal 41 has the reset function of the condition data, conditions for cards of every kind of performance can be set.

If an answer NO is obtained in step A3 or in step A4, the control goes to step A6, and it is determined if the decision NO has occurred more than 3 times or not. In this case, the number of times of this NO determination has occured is recorded in the counter area of working RAM 73, and the value of this count data is checked by main controller 77, to perform the decision in step A6. In case an answer NO is determined in step A6, the control goes to step A1 and the initial data is sent to IC card 11. In step A6, if the answer YES is given, that is, it is determined that the answer-to-reset data generated from card 11 does not correspond to this terminal 41, main controller 77 sends a control command to reader/writer controller 80. Then, the plunger in reader/writer mechanism section 102 is pulled to release the card from being locked, and the IC card is discharged resulting in disconnection of the card and the terminal. Therefore, if the IC card is not compatible with this system or if it is impossible to set the operating conditions, in step A6, the system is disconnected from card 11. Trouble can be prevented from occurring.

Selecting Processing

Figure 6B:
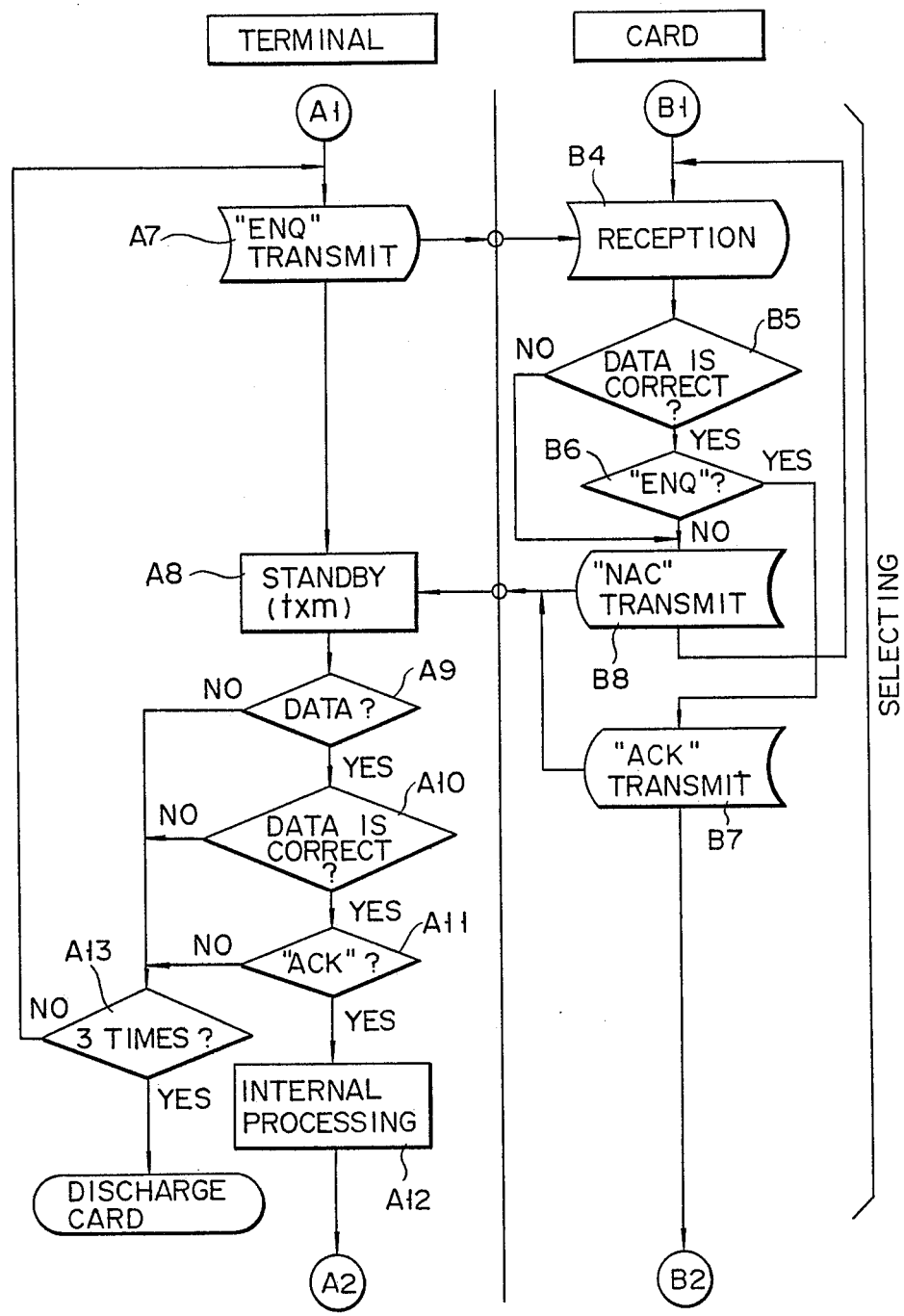

In step A5, after completion of setting an initial parameter in card 11 as set to the terminal, the control proceeds to the step S7 of FIG. 5, i.e. step S7 shown in FIG. 6B. Main controller 77 takes out "ENQ" code, that is, the code for enquiring if the card 11 in the other party is normally operated under operating conditions as set in step A5, from program ROM 74. The code is then transferred to IC card 11 by way of system bus 71, output controller 87, output buffer 88 and I/O terminal. Card 11 receives the "ENQ" signal from the I/O terminal, through controller 60 and input buffer 59, and writes it into working RAM 56 (step B4). In this case, in step B5, input controller 60 performs the parity check of "ENQ" signal. If the answer in this step is YES indicating that the parity check of the input signal is OK, the control proceeds to step B6. In step B6, system controller 56 checks if the "ENQ" code written into working RAM 55 can be accepted as the normal "ENQ" code. In this step, if the answer is YES, that is, it is determined that the "ENQ" code can be accepted as the normal one in the normal operating condition, the control goes to step B7. On the basis of the decision that this card 11 is placed in the normal operating condition under the setting condition at terminal 41, system controller 56 takes out "ACK" code from system program ROM 54, and transfers it to terminal 41 via output buffer 61, output controller 62, and the I/O terminal. In step B5 or B6, if the answer is NO, the control advances to step B8. In this step, the controller 56 determines that this card 11 does not operate normally under the conditions as set by terminal 41, or determines that there is some trouble in the transmission path between terminal 41 and card 11. On the basis of such determination, system controller 56 reads out "NAC" code from system program ROM 54, and transmits it to terminal 41 via output buffer 61, output controller 62 and the I/O terminal.

Upon receipt of this, terminal 41 receives "ACK" signal or "NAC" signal as sent from card 11 via the I/O terminal, in the standby mode in step A8. In this case, in step A9, it is determined if the signal "ACK" or "NAC" is received in the response wait time of 150 ms, for example, of IC card 11 as set in timer 101 in step A5. In step A9, the answer of YES is given. In other words, the main controller 77 decides that the signal of "ACK" or "NAC" is written into working RAM 73 through I/O terminal, input controller 90, input buffer 89, and system bus 71, within the wait time of IC card 11 as set in timer 101. Then, step A10 is executed. In this step, main controller 77 decides that the data as written into working RAM 73 is proper, that is, corresponds to this terminal 41. If the answer of this step is YES, the next step A11 is executed. In this step, main controller 77 decides if the code as written into working RAM 73 is "ACK" or not. If the step A11 gives the answer of YES, that is to say, if the signal from card 11 as received in step A8 is "ACK", and card 11 normally operates under each operating condition as set in step A5, the decision is made that the transmission path between terminal and card is normal. The control flows to step A12. In this step, main controller 77 reads out the terminal code TC from terminal attribute ROM 75. The terminal code TC is different with the type of the terminal. The read out terminal code TC is latched in output buffer 88. The controller is set in standby state for the attribute exchange processing in the next step.

In step A9, A10 or A11, if the answer of NO is given, the control proceeds to step A13. In this step, it is determined if the number of the answers of NO reaches three times. The number of the NO answers in step A9, A10 or A11 is stored in the count data area of working RAM 73. This count data is checked by main controller 77, to make the decision of step A13. In step A13, if the answer is NO, the step A7 is executed again to send the "ENQ" code to IC card 11. In step A13, if the answer is YES, main controller 77 sends a control command to read/write controller 58, to drive the plunger in reader/writer mechanism 102, to put out IC card 11 and to electrically disconnect it from the terminal. The answer YES in step A13 means that the signal sent from card 11 does not correspond to terminal 41, or that the signal sent from card 11 is the "NAC" signal, and IC card 11 does not operate normally under operating conditions as set in step A5, or that some trouble occurs in the transmission path between the terminal and the card. In this way, after setting of the initial parameter in step A5, if the IC card set to this terminal 41 will not operate normally, the decision is made that the card improperly corresponds to the terminal or that transmission path trouble occurs. Then, the card 11 is disconnected from the terminal. The trouble occurrence can be prevented beforehand.

Attribute Exchange Processing

Figure 6C:
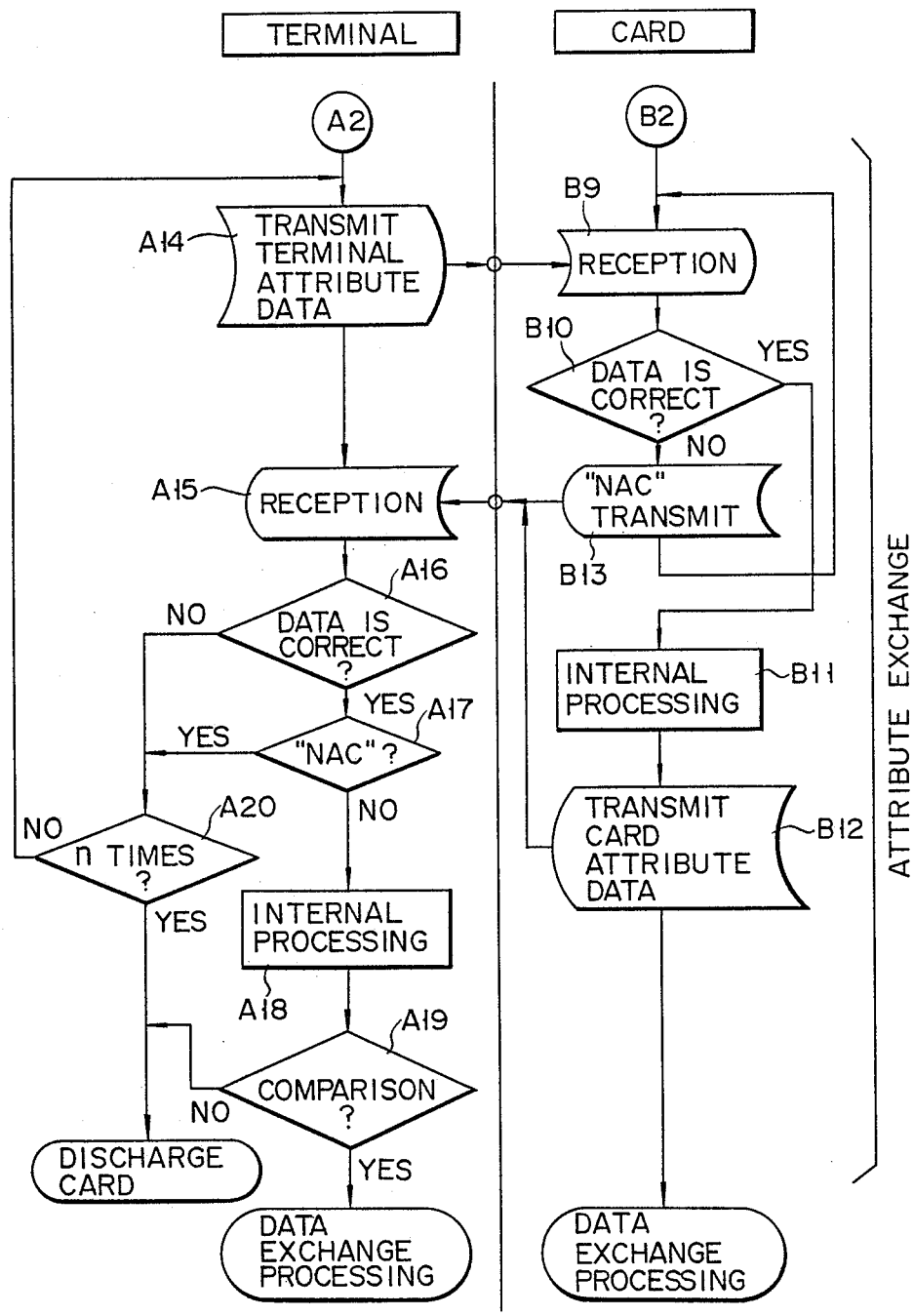

Next, the processing of the attribute exchange shown in step S8 of FIG. 5, or FIG. 6C will be explained.

Figure 17:
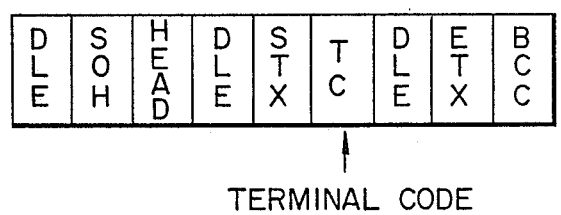
FIG. 17 shows a data format when the terminal code (TC) stored inside the card terminal is sent to the IC card.
Figure 18:
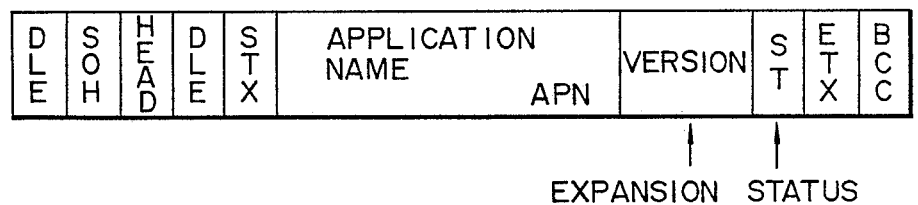
FIG. 18 shows a data format when the card application name (APN) and the card status data (ST) stored in the IC card is sent to the terminal.

First, as explained in step A14, terminal 41 transfers the terminal code TC as latched and set into output buffer 88 in step A12, to the card 11 side via the I/O terminal. In this case, terminal code TC is placed in a format as shown in FIG. 17, and transferred. The card 11 side, in step B9, receives the terminal code TC via input controller 60 and input buffer 59, and stores it in working RAM 55. In step B10, input controller 60 performs a parity check on the transfer signal incorporating the terminal code TC, and determines if the data contents are correct or not. If the answer is YES, in other words if the parity check is determined as OK, the control moves to step B11. In this step, system controller 56 takes out the application name (APN), which is stored in application RAM 53 and varies with the type of card, and latches it into output buffer 61, and the control goes to the next step. Then, in step B12, the application name APN which was latched into output buffer 61 in step B11, is transferred to the terminal 41 side via output controller 62 and the I/O terminal. In this case, application name APN is arranged in a format such as that shown in FIG. 18, and is transferred as a card classification code. This name area is composed of 12 bytes, including the expansion byte (2 byte). Again, at the time of transfer of this code APN, the card status data ST stored in data memory 65 is transferred to the terminal 41 side via read/write controller 58 and card status buffer 66, as the card classification code. In the above step B10, if the answer is NO, the control moves to step B13, system controller 56, based on the "read-in impossible" decision, takes out the "NAC" code from system program ROM 54, and sends it to the terminal 41 side via output buffer 61, output controller 62, and the I/O terminal. In step B10, data is checked by using the parity check system. The compatibility of the IC card and the terminal may also be checked by comparing the terminal code TC and the application name code which represents the attribute of the card. When answer is NO in step B10, the control goes to step B13 and "NAC" code is outputted.

Then, the terminal 41 side, in step A15, receives the card classification code and "NAC" signal that was sent from the card 11 side via the I/O terminal, and stores it in working RAM 73. Then, the control goes to step A16, and main controller 77 determines if the data written into working RAM 73 corresponds properly to this terminal 41 or not. If the answer in step A16 is YES, the control goes to step A17, main controller 77 determines if the data written in working RAM 73 is "NAC" or not. If, in step A17, the answer is NO, that is to say, if the data sent from the card 11 side is not "NAC", and it is determined that it is a card classification code including APN and card status data ST, and the control assumes a card classification decision flow shown in steps S18 and A19.

On the other hand, if NO in step A16, or YES in step A17 is obtained, the control goes to step A20, and it is determined if the number of occurrences of NO in step A16 and YES in step A17 exceeds a predetermined number or not (for example, n=2). In this case, the number of occurrences of the above NO and YES answers is recorded in the form of count data of working RAM 73, and the decision in Step A20 is accomplished by check of these count data values by main controller 77. Then, if the determination in step A20 is NO, the control returns to step A14, and the transfer of terminal code TC to IC card 11 is performed. If the answer in step A20 is YES, if it is determined that the contents of the signal as sent the card 11 side do not correspond to this terminal 41, or if the signal sent from the card 11 side is an "NAC" signal, and terminal code TC is determined to be "impossible to receive", main controller 77, by sending a control command to reader/writer controller 80, drives the plunger of reader/writer mechanism unit 102 to reject IC card 11 and disconnect it. Because of this, even in case the data transfer of terminal code TC and the card classification code cannot be done properly, at the step following the start of normal operation by the initial parameter settings of the terminal 41 side, the connection between the card terminal and the unsuitable card 11 is broken, and trouble is prevented beforehand.

Application Name Discrimination Processing

Next, the card classification decision operation of steps A18 and A19 will be explained.

Figure 19:
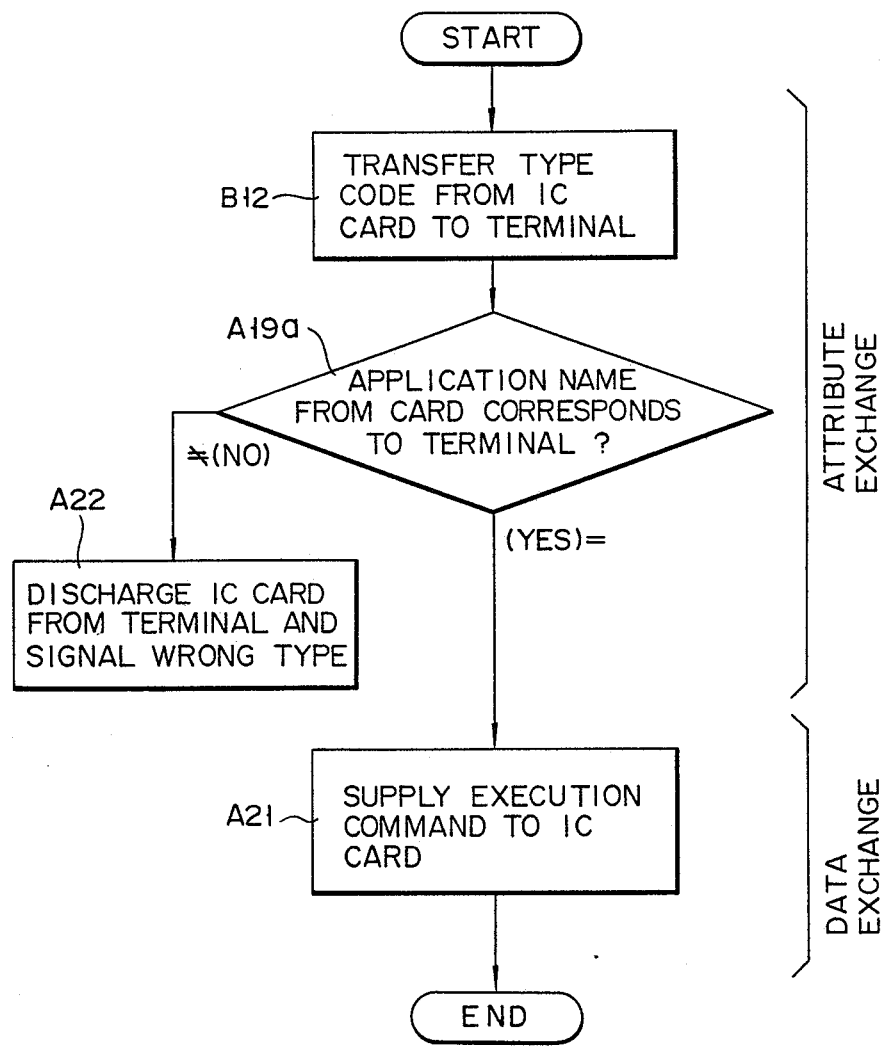
FIG. 19 shows a flowchart illustrating a card classification discriminating operation whch is executed, using a card classification code as sent from the IC card, in the terminal side.

FIG. 19 shows the above card classification decision operation in detail. First of all, in step B12, the card classification code, application name APN, that was sent from the card 11 side and stored in working RAM 73, is taken out by the main controller 77 in step A19a, and it is determined if its application classification corresponds to that of the application name APN already stored in terminal attribute ROM 75 or not. Here, assuming that terminal code TC of this terminal 41 is a merchant code, that application name APN is, for example, "abc bank counter installation", and that the application name APN of the card classification code sent from the card 11 side is, for example, "savings withdrawals and deposits of the cd branch of abc bank", in step A19, both application names are judged to be the same, and the control moves to the data transfer processing following step A21. In step A21, based on the decision in step A19a that the classification of the currently connected card 11 corresponds to that of this terminal 41, and for the first time, a regular command is taken out of system program ROM 74, and transferred to the card 11 side. On the other hand, in case the application name of the card classification code sent to the terminal 41 side in step B12 is, for example, "xy trust company general purchase card", the card classification in step A19a is determined not to be the same, and card rejection processing is implemented. In step A22, based on the decision that the classifications of the currently connected IC card 11 and this terminal 41 are not the same, main controller 77, by sending a control command to reader/writer controller 80, drives the plunger of reader/writer mechanism 102 to reject the IC card 11 and disconnect it. At the same time, it sends a control command to display drive controller 78, which causes a "wrong type" message to be displayed by display unit 44. In this embodiment, the application name APN is prestored in terminal attribute ROM 75, but, as an alternative, the application name APN can be written into working RAM 55 by inserting a starting card after the terminal power is turned on. As mentioned above, when the intended purpose of IC card 11 does not agree with the classification of terminal 41, due to the fact that the actual data transfer was not performed, the trouble caused by terminal misuse is prevented beforehand.

Command Code Discrimination Processing

The terminal command discriminating operation in which following the card classification discrimination operation, a command code is sent from the terminal 41 side to the card 11 side, and actual data transfer processing is performed, will be described.

Figure 20:
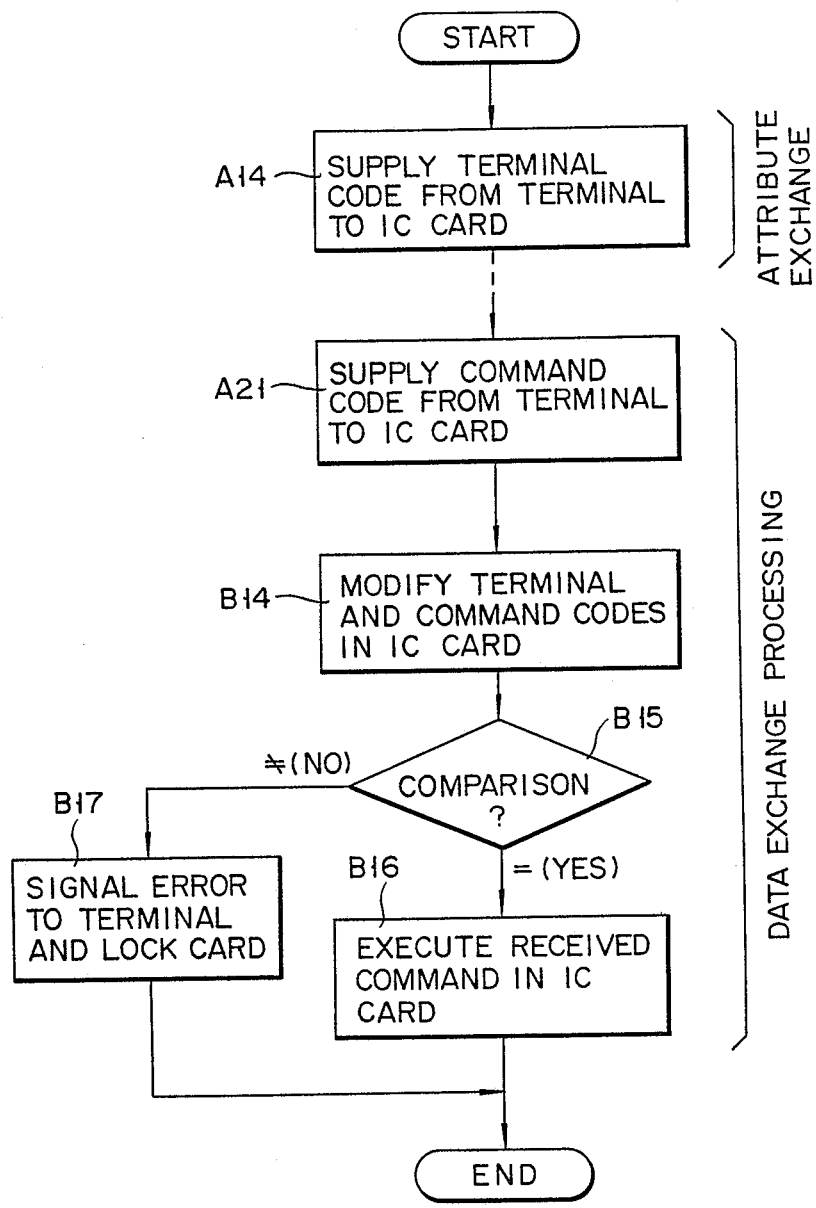
FIG. 20 shows a flowchart illustrating a terminal command checking operation which is executed in the IC card side, using a terminal code and a terminal command code as sent from the card terminal.

FIG. 20 shows the terminal command verification operation in detail. First, in step A14, the terminal code TC already sent from the terminal 41 side and stored in working RAM 55 of IC card 11, and the command code (COM) sent in step A21 of FIG. 19 (the data exchange start step), are arithmetically processed according to a specified formula in step B14. Then, the arithmetically processed terminal code TC' and its command code (COM'), are comparatively judged, to determine if they have a properly corresponding relationship or not in step B15. If the terminal command code (COM') which was sent in step A21 is, for example, the comparison/verification command (PIN Compare) of the personal identification number, terminal command code agreement (TC=PIN Compare) is determined. If the terminal command code is, for example, the write command of the personal identification number (PIN Write), it is determined in step B15 to be a terminal command code disagreement (TC' is not equal to PIN Write'). In other words, the results of the comparative judgement of the terminal code TC' and its command code COM', in step B15, conform with a terminal code and command code chart, as shown in FIG. 21. The coincidence decision is given only when the commands that should be present (shown by a circle) for each terminal are sent to the card side. When commands that should not be present are sent, the non-coincidence decision is given. In step B15, if the coincidence decision between the terminal code TC' and command code COM' is given, the control moves to step B16. According to the command code whose conformance to terminal 41 has been identified, (in this case, the personal identification comparison/verification command), the personal identification number keyed in from the terminal 41 and the PIN stored in the data memory of card 11 are compared by comparator 63. Then, if the above PINs coincide, the data transfer exchange processing operation of the cash transaction is performed. On the other hand, if in step B15, the terminal code TC' and the command code are determined to be noncoincident, and the control moves to step B17. System controller 56 informs terminal 41 of the fact that command code as sent in step A21 is an error code which does not correspond to terminal code TC. Further, it locks system program ROM 54 or data memory 65, to prevent the incorrect reading out of data from the incorrect writing into the system program ROM 54. Therefore, if terminal 41 is modified with intention of improper use of card 11, it is impossible to execute the correct commands. Therefore, an IC card system with a high security factor can be realized.

Registration and Check of Card Status

The registration of the card status in the IC card system will be described.

Figure 22:
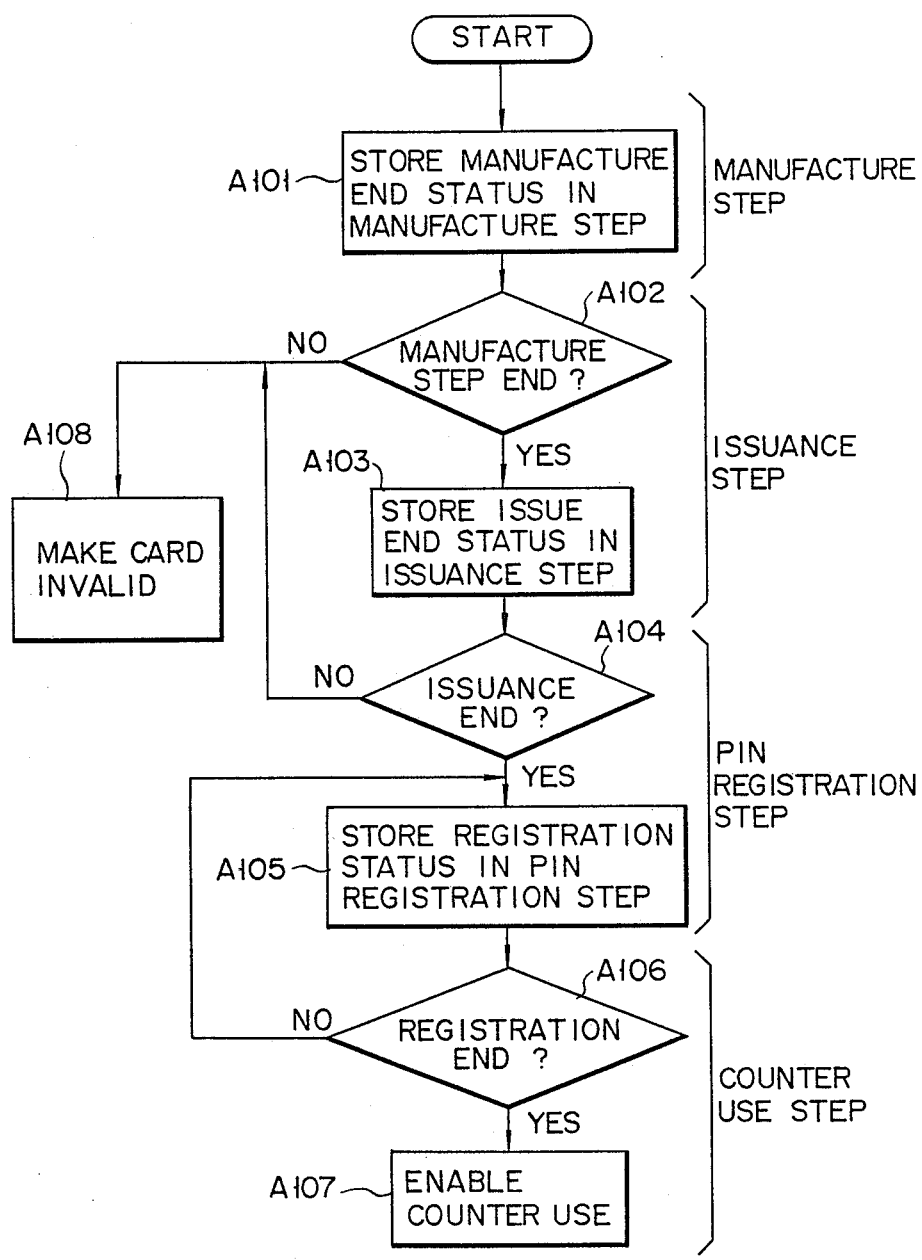
FIG. 22 shows a flowchart illustrating a card status registration function in the IC card system.
Figure 23:
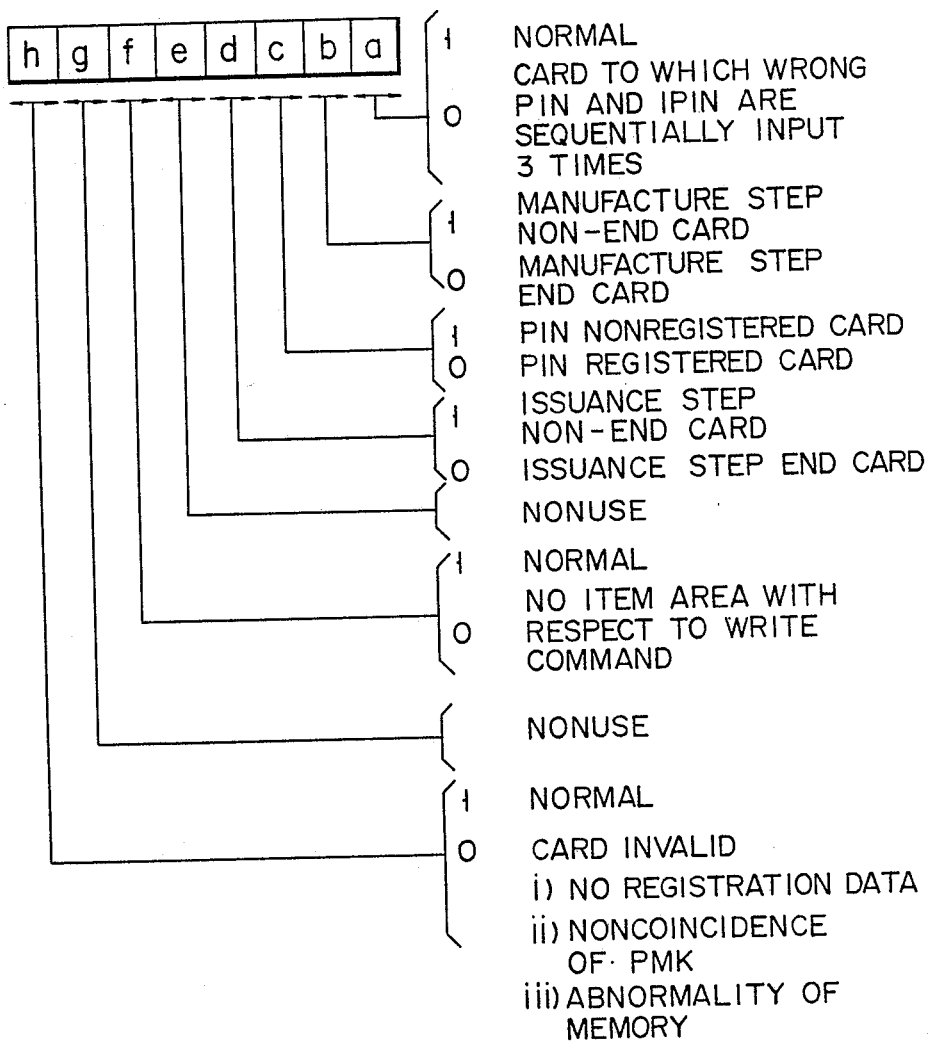
FIG. 23 shows a diagram illustrating the code contents of the card status data (ST) stored in the IC card.

FIG. 22 shows a flowchart for illustrating registration and check of card status. In step A101, at the time that manufacturing of IC card 11 is completed, the manufacturing end status is written into data memory 65 of IC card 11 at card manufacturing terminal 12 as shown in FIG. 1, for example. Following the end of the card manufacturing step, the control goes to the card issuing step. In this stage, if IC card 11 is set to card issue terminal 11, the terminal 22 reads in the status data ST in the data memory 65 of card 11, in step A102. In this step, it is determined if the manufacturing end status is present or not. If the determination is YES, a predetermined card is issued and step A103 is executed. This step is executed to write the issuing end status into the data memory 65 in card 11, by card issuing terminal 22. After the end of card issuing, the control advances to the PIN registration step. When IC card is set to PIN registration user terminal 32, terminal 32 reads in, in step A104, the status data ST in the data memory 65 of card 11, and determines if the issuing end status is present or not. If the answer in the step is YES, the control advances to step A105, following the end of a predetermined PIN registration step. The PIN registration status is written into the data memory 65 of card 11 by means of user terminal 32. After the end of PIN registration, the shop use step is executed in which IC card 11 is set to shop terminal 41 as shown in FIG. 2, for example, and terminal 41 in step A106 reads in the status data in the data memory 65 of card 11, to check whether the PIN registration status is present or not. In this step A106, if the answer of YES is given, step A107 is executed to allow purchasing of goods in shop. FIG. 23 illustrates the card contents of card status data ST as stored in the memory 65 of IC card 11. In the 8-bit cord, small b indicates a bit representing the manufacturing end status written into in step A101. c is a bit indicating the PIN registration status written into in step A105. d is a bit representative of the issuing end status written into in step A103. The status data ST further contains a bit representing a mistaken entry of the verification number as made continuously three times, which is associated with the bit a. The bit f is associated with a bit representing that there is no a write item area for the write command from terminal 41. The bit h is associated with a bit representing a card invalid state. Bits e and g are not used.

In steps A102 to A104, if the answer is NO, step A108 is executed. The answer N means that the manufacture step end status is not written into data memory 65 of IC card 11 when the control goes to the card issuance step, or "1" is raised in the bit area b in FIG. 23, or the issuing or issuance end status is not yet written into the data memory 65 in the PIN registration step, or "1" is raised in the bit area d in FIG. 23. In the step A108, it is determined that the step which should have been ended is not yet ended, that is, decision is made of a "possibility of misuse". On the basis of this decision, flag is set in flag area 64 of IC card 11. The system controller 56 is made substantially impossible. With this, the card is made invalid. In step A106, it is assumed that the answer is NO. In this case, in the store use step, the PIN registration status is not written into data memory 65 of IC card, viz. "1" is set in the bit area c in FIG. 23. Therefore, the terminal 41 in the store fails to identify the card holder using the PIN, and he or she cannot purchase goods. Then, the registration of PIN in the PIN registration step is required. In such a case, however, as described above referring to FIG. 1, for registering PIN by user terminal 32, the IPIN mailed from the issuer to the user is required for the PIN write key code. Therefore, if the IC card is stolen, the registration of a false PIN is absolutely rejected. In this way, the misuse is prevented. If a person attempts to misuse an IC card which has not been subjected to the normal method of card manufacture, issuance, and PIN registration, the card status data ST in the data memory 65 of the card checks such IC card, to guard against card fraud. Further, if the bit areas a, f, and h in FIG. 23 are appropriately displayed by the terminal in actual card use, mistaken key-in operation of PIN can be reduced.

As seen from the foregoing, with such an arrangement of the IC card system, in the sequence of the steps B3 - A2 - A5 in FIG. 6(A), the answer-to-reset data stored in data ROM 52 of card 11 is sent to terminal 41, and stored in initial parameter RAM 75. On the basis of the condition setting data as stored in RAM 76, it is possible to set the maximum data transfer capacity limited by main controller 77, the data write voltage set by Vpp power source 95, continuous application time of the data write voltage set by Vpp timer 96, and the like. Further, after the operating condition setting in the IC card 11, the "ENQ" signal is sent to IC card 11 in order to check the normal operation of the IC card. This is made in steps A7 to B4. For this operation check, a check is made if the card 11 can normally receive this "ENQ" signal. If it is not normally received, step B8 executes the transmission of the "NAC" signal to terminal 41. Then, the control advances to the card rejection process after passing steps A11 to A13. When the IC card 11 does not operate normally and the operating conditions as set by terminal 41, the control does not move to the information exchange process, and the signal transmission between terminal 41 and card 11 is cancelled.

[Effects of the Invention]

As seen from the foregoing, according to this invention, the data representing the operating conditions of the IC card per se are stored in the card. In setting the card to the terminal, the IC card is operated by the card terminal on the basis of the operating conditions setting data as stored in the IC card. Then, the signal for checking the normal operation is transferred between the terminal and the card. This check signal is used for checking the compatibility of the IC card with the terminal. Therefore, if the operating conditions of the IC card are changed due to its improved performance, the operating conditions can be set by the terminal, according to the type of the IC card used. Further, the operation status of the IC card for which the new operating conditions have been set, can be checked, to prevent the occurrence of trouble before the information exchange process. Thus, the security of transactions using IC cards becomes very high.

What is claimed is:

1. An integrated circuit (IC) card system including an IC card, and a card terminal for use in combination with the IC card, comprising:
   storing means in the IC card for storing data to set operating conditions pertaining to the IC card;
   transmitting means for transmitting data stored in said storing means to a card terminal;
   receiving means for receiving the data transmitted by said transmitting means;
   setting means in the card terminal for setting conditions for operating said IC card, in accordance with the data received by said receiving means;
   supplying means for supplying a check signal to said IC card, according to the conditions set by said setting means; and
   judging means for judging whether or not the check signal supplied from said card terminal is correct.

2. The IC card system according to claim 1, comprising means for transmitting a signal representing applicability of the IC card to said card terminal, when said judging means judges that a check signal supplied from said card terminal is correct.

3. The IC card system according to claim 2, comprising:
   means for detecting said signal representing applicability; and
   means for disconnecting the card terminal from said IC card after said detecting means does not detect the signal representing applicability.

4. An integrated circuit (IC) card system, comprising:
   a card terminal including;
   means for storing attribute information determined according to a particular usage of said terminal, and
   means for transmitting the attribute information of said terminal to an IC card from said storing means;
   an IC card including;
   means for judging whether or not the attribute information transmitted from said terminal is correct,
   means for storing attribute information that is different for each of a number of different kinds of IC card,
   means for transmitting the attribute information to said terminal when said judging means judges that the attribute information of said terminal is correct; and
   said card terminal also including,
   means for checking whether or not a correspondence relationship exists between the attribute information of the card terminal and that transmitted from said IC card.

5. The IC card system according to claim 4, comprising:
   means for disconnecting said IC card from said card terminal when said attribute judging means of said IC card judges that the attribute information of the IC card does not correspond to that of the card terminal.

6. The IC card system according to claim 5, wherein attribute information stored in said IC card and in said card terminal corresponds to an application name of said IC card.

7. An integrated circuit (IC) card system including an IC card, and a card terminal for use in combination with the IC card comprising:
   means, provided in said card terminal, for storing attribute information determined according to particular usages for said card terminal;
   means for transmitting the attribute information of said card terminal to said IC card from said attribute information storing means;
   means for outputting processing commands for executing operations in said IC card, to said IC card from said card terminal;
   means, provided in said IC card, for judging whether or not the processing commands output from said card terminal correspond to the attribute information of the card terminal; and
   means, provided in said IC card, for executing commands that are judged to be those corresponding to the attribute information of said card terminal.

8. The IC card system according to claim 7, wherein said attribute information stored in said card terminal is adapted to determine an operation executed between said card terminal and said IC card, and the attribute information stored in said card terminal is different for each usage of the card terminal including manufacturing, issuing, and customer transactions.

9. The IC card system according to claim 7, comprising:
means for disconnecting said IC card from said card terminal after the judging means in said IC card judges that the processing commands output from said terminal do not correspond to the attribute information of said terminal.

10. An integrated circuit (IC) card system, comprising:
means for writing, into an IC card, process termination data at each termination of corresponding processes that occur between manufacture of said IC card and usage of the card by a local user;
means for storing the data supplied from said writing means; and
means for checking, at each process of manufacture of said IC card, whether or not data stored in said storing means is correct.

11. The IC card system according to claim 10, comprising:
means for making said IC card invalid when it is judged by said checking means that the data in said storing means is not correct.

12. The IC card system according to claim 10, wherein said processes include card manufacture, card issue, and registration of a personal identification number (PIN).

* * * * *